(12) United States Patent
Fuller et al.

(10) Patent No.: US 11,677,916 B2
(45) Date of Patent: Jun. 13, 2023

(54) SYSTEM AND METHOD OF ALTERING THE APPEARANCE OF LIQUID AND SOLID PHYSICAL OBJECTS OR FORMS

(71) Applicants: Mark Fuller, Sun Valley, CA (US); James Doyle, Sun Valley, CA (US); Gautam Rangan, Sun Valley, CA (US); Scott Winslow, Sun Valley, CA (US); Isaiah Gernhardt, Sun Valley, CA (US); Ting Zhang, Sun Valley, CA (US)

(72) Inventors: Mark Fuller, Sun Valley, CA (US); James Doyle, Sun Valley, CA (US); Gautam Rangan, Sun Valley, CA (US); Scott Winslow, Sun Valley, CA (US); Isaiah Gernhardt, Sun Valley, CA (US); Ting Zhang, Sun Valley, CA (US)

(73) Assignee: WET, Sun Valley, CA (US)

( * ) Notice: Subject to any disclaimer, the term of this patent is extended or adjusted under 35 U.S.C. 154(b) by 0 days.

(21) Appl. No.: 16/805,666

(22) Filed: Feb. 28, 2020

(65) Prior Publication Data

US 2020/0413013 A1 Dec. 31, 2020

Related U.S. Application Data

(60) Provisional application No. 62/812,216, filed on Feb. 28, 2019.

(51) Int. Cl.
*H04N 9/31* (2006.01)
*H04N 5/262* (2006.01)
*H04N 23/90* (2023.01)

(52) U.S. Cl.
CPC ......... *H04N 9/3179* (2013.01); *H04N 5/2628* (2013.01); *H04N 23/90* (2023.01)

(58) Field of Classification Search
CPC .... H04N 9/3179; H04N 5/247; H04N 5/2628; H04N 13/221; H04N 13/264; H04N 13/275; G03B 21/608
USPC .......................................... 348/222.1; 353/10
See application file for complete search history.

(56) References Cited

U.S. PATENT DOCUMENTS

| 5,445,322 | A | * | 8/1995 | Formhals | ............ | G03B 21/608 239/18 |
| 6,819,487 | B2 | * | 11/2004 | Palovuori | ............ | G03B 21/608 359/443 |
| 7,775,883 | B2 | | 8/2010 | Smoot et al. | | |
| 8,899,756 | B2 | * | 12/2014 | LaDuke | .................. | G09F 19/18 348/81 |

(Continued)

FOREIGN PATENT DOCUMENTS

WO WO 2018-169154 9/2018

*Primary Examiner* — John W Miller
*Assistant Examiner* — Omer Khalid
(74) *Attorney, Agent, or Firm* — Maceiko IP

(57) ABSTRACT

A system and method for altering the visual appearance of moving physical forms is disclosed. The moving physical forms may include solids, liquids, gasses and any combination thereof. The system and method may include video capturing devices for capturing video footage of the moving forms, a controller for altering the captured video footage of the moving forms, and video projecting devices for projecting the altered video footage back onto the moving forms.

7 Claims, 19 Drawing Sheets

(56) References Cited

U.S. PATENT DOCUMENTS

| | | | |
|---|---|---|---|
| 2013/0308064 A1* | 11/2013 | LaDuke | H04N 9/3194 |
| | | | 348/744 |
| 2014/0063279 A1 | 3/2014 | Ogura et al. | |
| 2017/0293998 A1 | 10/2017 | Kim et al. | |
| 2018/0090170 A1* | 3/2018 | Weksler | G11B 27/005 |
| 2018/0124329 A1 | 5/2018 | Hjelmström et al. | |
| 2018/0320859 A1* | 11/2018 | Philip | F21V 7/26 |
| 2020/0068131 A1 | 2/2020 | Tadano et al. | |

* cited by examiner

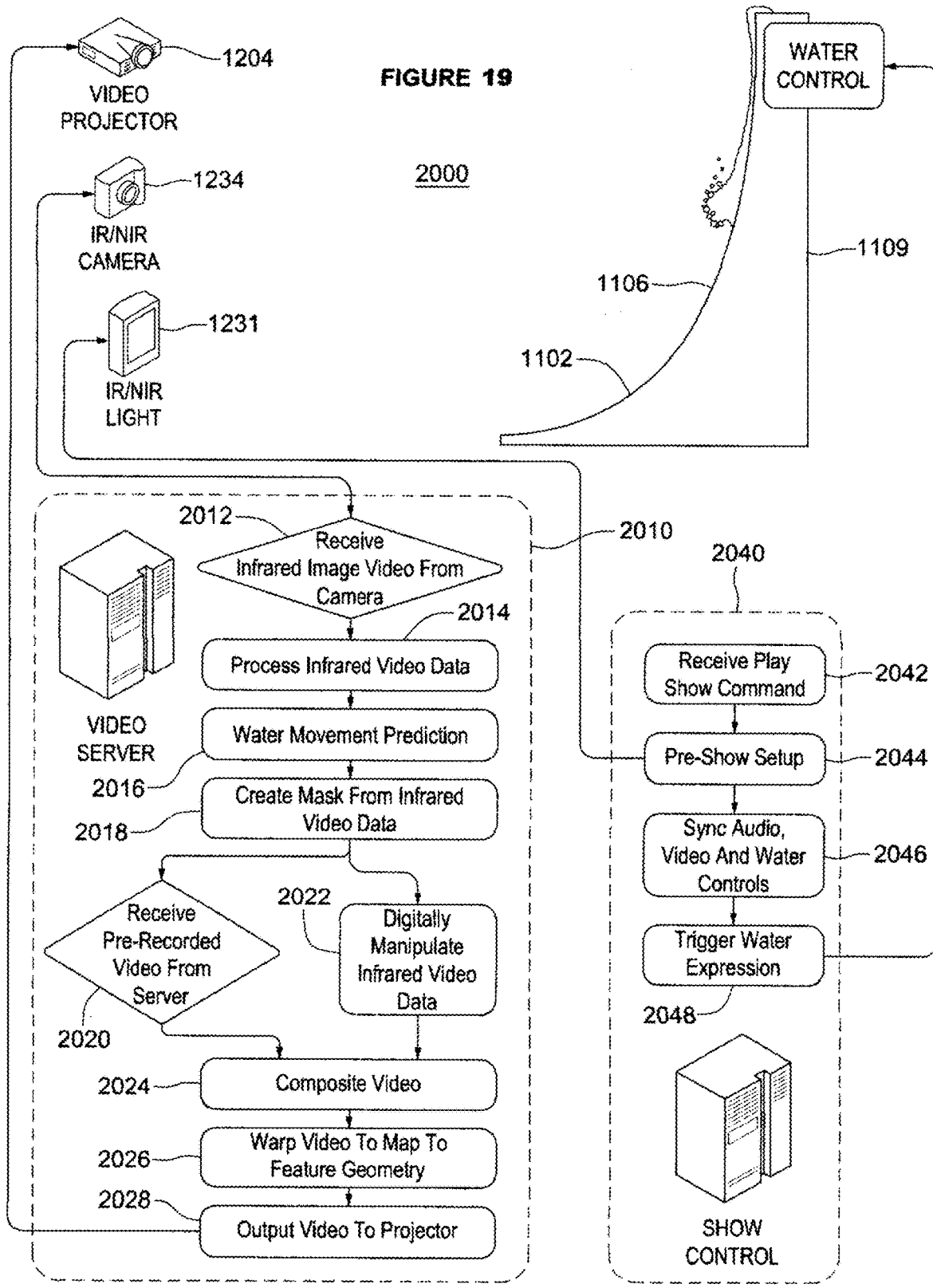

SYSTEM AND METHOD OF ALTERING THE APPEARANCE OF LIQUID AND SOLID PHYSICAL OBJECTS OR FORMS

CROSS-REFERENCE TO RELATED APPLICATION

This application claims the benefit of U.S. Provisional Application No. 62/812,216, filed Feb. 28, 2019, the contents of which are incorporated herein by reference.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

The current invention generally relates to a system and method of altering the appearance of liquid and solid physical objects, including altering the appearance of moving liquids and solids through the use of projected video, optics and optical techniques.

BACKGROUND OF THE INVENTION

Moving objects or forms have been used in displays and as forms of entertainment for many years. And, whether the entertainment includes balls being juggled, objects shot from a gun, sand traveling through an hour glass, or water emitted into the air or raining down, the level of entertainment typically relies on how precisely the moving objects or forms may be controlled.

In addition, due to the laws of physics and gravity, the motion of such traveling objects or forms may be predictable or assumed by the human brain. In fact, when humans view such moving objects, the human brain may quickly sense that the object may be moving under the combined forces of its launch force and/or gravity. For example, the human brain will watch balls being juggled and will sense that the balls are undergoing forces from the juggler as well as forces due to gravity. If however, the moving object exhibits an unexpected movement (for example, hanging in mid-air for a moment due to reduced gravity), the human brain will immediately recognize the movement as unnatural and will alert the frontal cortex of the viewer to pay attention. Accordingly, if such an event were possible, it may be used as an exciting form of entertainment.

Another example involves how the human brain perceives different forms of falling water, either in free fall or running down a vertical or slanted surface; or how the human brain perceives defines shapes or sprays of water, in any direction, where the water droplets defined some type of shape, such as a stream, fan or cone of water emitted from a nozzle. In this example, when humans see water, either as spraying in a form as described above, or falling as rain, or running down a surface, with its inevitable waves and surface indications, human minds quickly sense that the water is moving under the combined forces of its emitting force (pressure ejecting it from a nozzle) and gravity (in the downward direction). Human brains are so used to seeing water in these conditions that we immediately sense it as expected movement. If, however, you see water fall, or even stay motionless, in a reduced gravity or zero gravity environment, our brains sense this. Even a slightly reduced gravity field produces movement that our brains tell us is not being influenced by "normal earth gravity."

Accordingly, there is a need for a system and method to provide such visual effects in a display, form of entertainment or visual effect.

There is also a need for a system and method that may alter the visual appearance of moving objects, materials and forms.

SUMMARY OF THE INVENTION

The present invention is described in the Detailed Description of the Preferred Embodiments, as well as in the claims, appearing later. The following Summary of the Invention describes aspects of the present invention.

An aspect of the invention regards providing a visual effect of moving objects or forms seemingly defying the force of gravity. To this end, the system embodying the invention may include a material delivery device that may deliver solid or liquid objects, e.g., water. A projector system may take video of the moving objects or form and project it thereon, and a controller may control the foregoing. Because of the manner in which the human brain perceives motion, depending on the lighting of the surrounding environment, and depending on the relative speed of the moving objects or form, and the speed of the projected objects or forms, the moving objects or forms may appear to be suspended in midair, moving more slowly than the observer would expect due to the force of gravity, or even moving upward.

Another aspect of the invention regards a display which incorporates features described above. The display may include several sections or structures having a surface down which water may flow.

Other aspects of the present invention are described herein.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 14AA shows infrared components along with a projector.

FIG. 19 shows a flowchart regarding the manner in which recording and projection may occur in relation to an overall display.

DETAILED DESCRIPTION OF THE PREFERRED EMBODIMENTS

Figure 1:
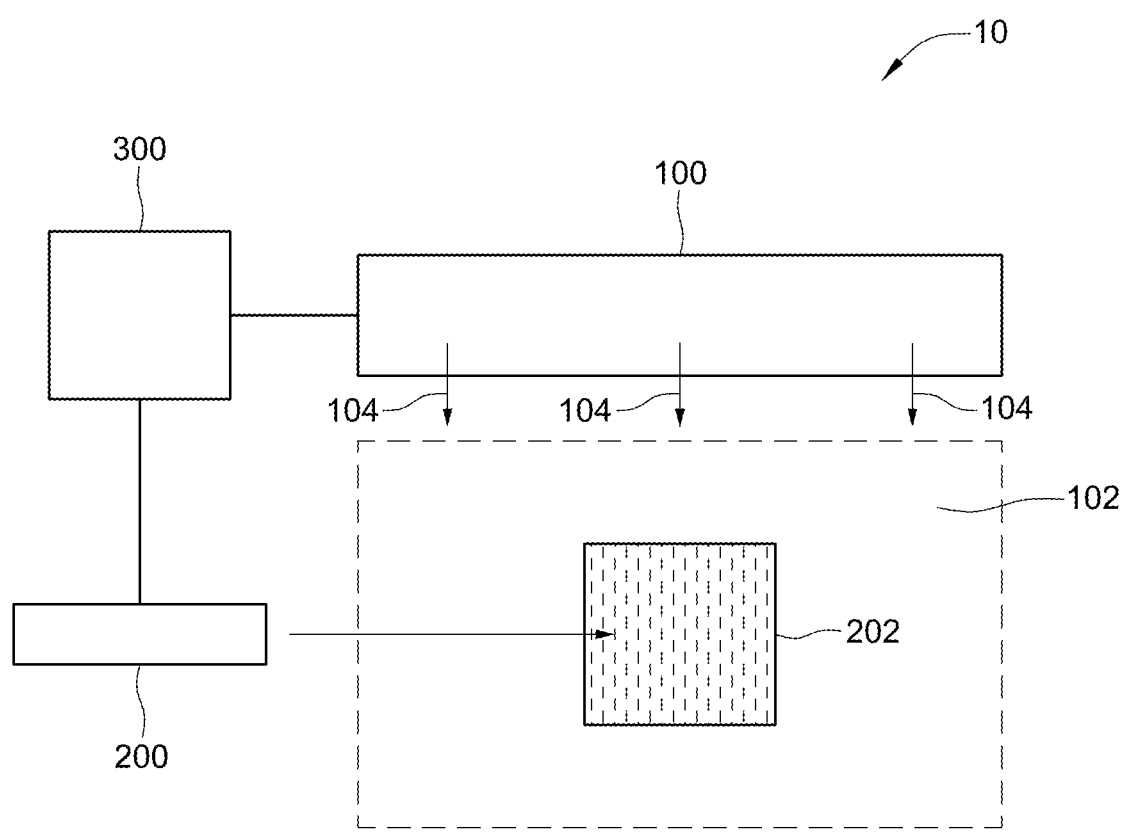
FIG. 1 shows aspects of an optically enhanced display according to exemplary embodiments hereof.

A system and method according to preferred embodiments of the current invention are described with reference to the figures.

Preferred embodiments hereof provide a system 10 that may include a presentation, show, display, performance, production, exhibition, demonstration, arrangement, or any type of visual effect that may involve projecting light, images, video, animation, graphics, phantasmagorias or other types of projected elements onto one or more physical objects or forms. The physical objects or forms may include any types of materials including, without limitation, solid forms, liquid forms, gaseous forms, and any combination thereof. At least a portion of the projected elements may be reflected off the physical objects or forms and be visible to viewers. In this way, the projected elements may alter, change or otherwise affect the visual appearance of the physical objects or forms.

In some preferred embodiments the physical objects or forms may include movement. That is, at least a portion of the physical objects or forms may be moving in one or more directions. For example, if the physical forms include solid materials such as a mass of sand or pebbles, at least a portion of the sand or pebbles may be falling through the air and/or running down a ramp. In another example, if the physical forms include liquid materials such as water, at least a portion of the water may be falling through the air as water droplets and/or flowing down the side of a structure (e.g., down a wall). In another example, if the physical forms include gaseous materials (preferably visible gases), at least a portion of the gas may be flowing or otherwise moving in one or more directions. The physical objects and/or forms may include any combinations of solids, liquids or gases, and that any portion of any combination of these materials may be moving in any direction.

For the purposes of this specification and to demonstrate the structure and functionalities of the current invention, the system 10 may be described with relation to the moving physical forms as including liquid material such as water. However, one of ordinary skill in the art, upon reading this specification, will recognize that the system 10 may be used with any type or combinations of types of physical objects and/or forms (liquids, solids and/or gasses), and that the scope of the system 10 is not limited in any way by the type or combinations of types of physical objects and/or forms that it may utilize.

In addition, while this specification may refer to the projected elements primarily as video, the projected elements may include any other types of projectable media such as animation, computer generated images, moving sequences of images, light, other types of media or any combination thereof.

In some embodiments wherein the physical forms may include moving water, the video footage projected onto the moving water may include video footage taken prior of the same or similar moving water. For example, video footage may be taken of a curtain of falling water droplets and the video may then be projected back onto the same curtain of falling droplets. In this case, the resulting appearance of the water may be that of a greater volume of falling droplets since the actual droplets, as illuminated by ambient light, may also be amplified by the brightly projected images of the projected droplets, falling at the same velocity and acceleration.

It is not necessary that each projected falling drop visually map itself onto a corresponding drop, as the general mass of falling droplets may provide the rough equivalent of a screen with integral movement, onto which the projected droplets appear. In a preferred embodiment, the observer is preferably not aware of any projection, provided care is taken not to reveal the projector, or the beam from the projector (such as if the room were smoky and the beam could be seen in the smoky air), or the projector is aimed in such a way that the lens of the projector can be seen (which can easily be avoided). It should be noted that since a light ray, such as from a projector, strikes a non-opaque object, such as a translucent or transparent rain drop, the light is not all reflected back toward the source; most of the light is refracted by the difference in indices of refraction between air and water, and thus continues generally forward, but at a bent angle. Thus, in a preferred embodiment, the rain or falling droplets, are best seen when back lighted.

In a preferred embodiment, aspects of the projected video may be altered prior to being projected back onto the water. For example, the playback speed of the video footage may be slowed down, sped up or otherwise varied or altered. In another example, the physical orientation of the projected video footage may be set so that the projected video footage of the moving water may not be exactly aligned with the moving water upon which it may be projected. For example, the delivered water may include a curtain of water droplets falling directly downward, while the falling water droplets depicted in the video footage may be set to fall downward at an offset angle. In this way the projected video footage may affect the visual appearance of the falling water.

Continuing with the above example, when the playback speed of the video footage of the falling water droplets is slowed down and projected back onto the curtain of falling droplets, a viewer of the water may see a combination of the actual water droplets falling at a normal speed or acceleration and the projected images of the water droplets falling at a slightly slower speed or acceleration. The brain of the viewer may subconsciously combine the two speeds (e.g., may average the two speeds) of the real and projected rates of speed, such that the perceived overall speed of the falling water droplets may suddenly appear to be slowing down in mid-air. A similar phenomenon may result when the speed of the projected video is increased, with the viewer perceiving the water as speeding up.

In a preferred embodiment, the foregoing may occur in an environment where the ambient light is considerably brighter than the projected brightness. In this embodiment, then the average of the real and projected speeds is not half and half, but is biased in favor of the projected speed. In a reasonably dark environment, the amount of bias towards the projected speed increases.

In addition, if the video footage is slowed to a rate that approaches zero (e.g., motionless) then the water droplets may appear to be hanging in mid-air, in complete defiance of gravity. Furthermore, if the video footage may be reversed such that the projected water droplets may be traveling upward, the perceived motion of the droplets may be that of rain falling upwards. Given this example, it can be seen that varying the upward and downward rate of the projected water droplets, in an interesting and artistic manner, may result in the very real appearance that the droplets (e.g., rain), is falling faster than gravity should allow, slower than gravity should allow, stopped, or in reverse of, and any interesting combination of these in sequence. In addition, such sequencing can be coordinated with music to create a very artistic composition.

It is not necessary that the projected imagery be the actual filmed images of rain or other moving object or form. Computer graphics may be used and may allow the creation of virtual images of rain drops or other moving objects or forms, which can be used as described above, or even changed in size or colored, or turned from rain into sparkles or other pointillist objects in a field.

Non vertical movements may also be introduced, giving the illusion that the moving objects or forms are falling or moving along field lines affected by some non-seen force. For example, if the orientation of the projected video footage is set to an offset angle compared to the actual falling water droplets, a viewer may see a combination of the actual water droplets falling at an expected angle (e.g., directly downward) and the projected images of water droplets falling at the offset angle. The brain of the viewer may subconsciously combine the two trajectories (e.g., may average the two trajectories) such that the perceived overall trajectory of the falling water droplets may appear to be suddenly pushed at an offset angle giving the illusion that the droplets are falling along field lines or trajectories affected by some non-seen force.

The above examples are meant for demonstration purposes and other embodiments are within the scope of the current invention. For example, the video footage may be altered in any way prior to being projected onto the moving object or form, e.g., onto flowing water, such that the resulting perceived appearance of the water or other object or for4m may include any type of altered appearance. It is also understood that while these examples included video footage projected onto falling water droplets, any type of video footage may be projected onto any formation of liquid.

Further aspects of the system 10 and its various elements will next be described in more detail. Additional aspects of the system 10 will also be provided through the descriptions of various examples of use.

In a preferred embodiment as shown in FIG. 1, the system 10 may include a water delivery system 100, a projector system 200, a controller 300, and other elements or components as required by the system 10. As shown, the water delivery system 100 may deliver water 102 (depicted as dashed lines to represent any type, shape or formation of water), and the projector system 200 may project video footage 202 onto at least a portion of the water 102.

Delivery System

In a preferred embodiment, the system 10 may include a delivery system 100 that may deliver materials, object and/or physical forms such as water 102, or other types of materials such as solids and/or gases, within the system 10. Modified video footage 202 may then be projected onto at least a portion of the delivered water or other object or form 102 to visually alter the appearance of the water or other object or form.

In some exemplary embodiments hereof, the delivery system 100 may include material delivery devices 104-1, 104-2, . . . 104-n (collectively and individually 104). In the example where the materials may include water, the material delivery devices 104 may include, without limitation, water nozzles, water manifolds, water misters, water jets, SHOOTER® delivery devices, waterfalls, other types of material delivery devices 104 and any combination thereof. In this way, the delivered water 102 may be moving, flowing, running, falling, spraying, shooting, sprinkling or otherwise may include any type of movement. While FIG. 1 depicts three materials delivery devices 104, it is understood that any number of any combinations of types of materials delivery devices 104 may be used by the system 10.

Figure 2:
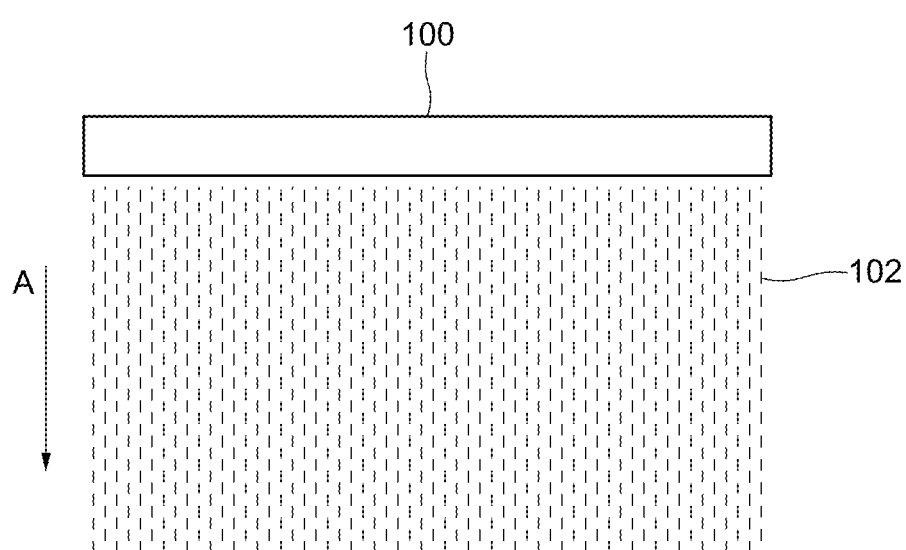
FIGS. 2-4 show aspects of water delivery devices according to exemplary embodiments hereof.
Figure 3:
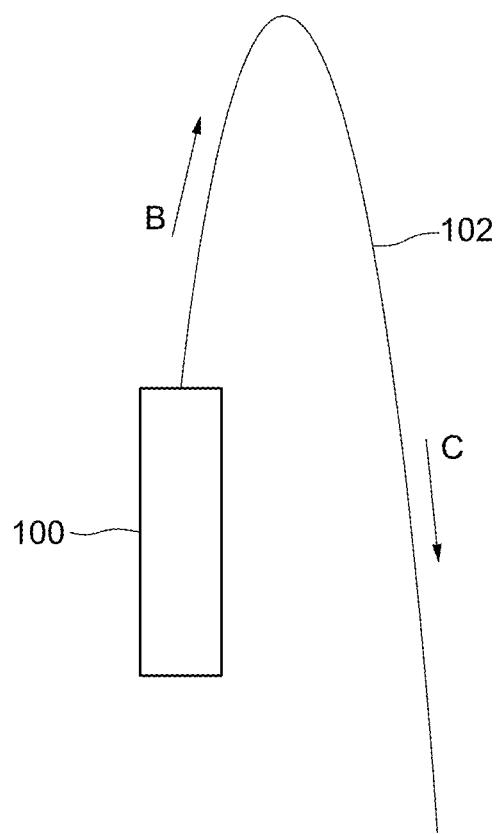

In addition, the water 102 may be delivered in any form or shape, or in any combinations of forms and shapes including, without limitation, droplets, sheets, curtains, mists, sprays, streams (laminar or otherwise), blooms, fans, cones, funnels, waterfalls, waves, other forms or shapes and any combination thereof. It is preferred that the delivered water 102 include at least a portion of water 102 that may include movement, and the movement may be in any direction or combinations of directions. In a preferred embodiment hereof as shown in FIG. 2, the delivered water 102 may free fall through the air. For example, in one implementation the water delivery devices 104 may include manifolds 104 that may release water droplets that may free fall directly downward through the air (as depicted by arrow A). In another embodiment as shown in FIG. 3, the water 102 may be emitted in an upward direction (e.g., at an angle between 0° and 90°) so that the water 102 may first include an upward/forward trajectory depicted by arrow B followed by a downward/forward trajectory depicted by arrow C (e.g., a parabolic trajectory). In another example, the water 102 may be emitted from a fan such that the water 102 can be made to appear to accelerate out of the fan at varying speeds. In yet another exemplary embodiment, the water 102 may be emitted downward by a nozzle at a speed that may be faster than the speed of free falling water.

Figure 4:
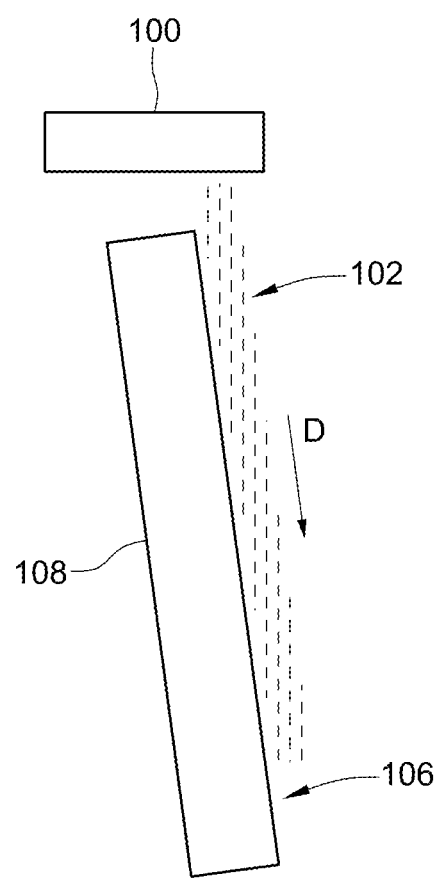

In another exemplary embodiment hereof as shown in FIG. 4, all or a portion of the delivered water 102 may run down a surface 106 of a structure 108 that may include any shape or form. The surface 106 may be vertical, slanted or any combination thereof. For example, the water 102 may be released by the materials delivery devices 104 onto a slightly non-vertical wall 108 such that the water 102 may then run down the surface 106 of the wall 108 (depicted by arrow D in FIG. 4). In another example, the wall 108 may be vertical. In another example, the structure 108 may include surfaces 106 that may be vertical and surfaces 106 that may be non-vertical (e.g., slanted), and any combination thereof. In another example, the structure 108 may include channels or other geometries that may generally guide the water 102 as it may flow down the structure 108. It is understood that the structure 108 may include any types of forms with any types of surfaces upon which water 102 may flow.

In addition, in one exemplary embodiment, the water 102 may be released continuously so that the water flow may be even and continuous (e.g., continuous free falling rain droplets of water). In another exemplary embodiment, the water 102 may be released in non-continuous patterns. For example, for water 102 released to flow down a structure 108 (sloped or otherwise) in varying spaced surges, the crest of each surge may appear as a white froth wave front running down the surface at the speed expected given the influence of gravity. In this case, if imagery of white, frothy waves 202 is superimposed on the real waves 102, the apparent velocity altering fall rate of visual combination can also be achieved.

It is understood by a person of ordinary skill in the art that the examples described above are meant for demonstration purposes and that the water 102 (or other types of materials) may be delivered by the material delivery devices 104 in any form(s) at any time, continuously or non-continuously or in any combination thereof. For example, a number of solid particles may be emitted from delivery devices 104 that may behave as a liquid. Alternatively, a number of larger solid objects may be delivered.

As showing further alternatives within the scope of the current invention, any particular material delivery device 104 may deliver water 102 in one form while another material delivery device 104 may deliver water 102 in the same or different form. In this way, a multitude of material delivery devices 104 may deliver water 102 (or other types of materials) in a variety of forms, and each form 102 may be synchronized, orchestrated and/or choreographed with each other form of delivered water 102 as desired. It is also understood that the scope of the system 10 is not limited in any way by the form(s) that the delivered water 102 may take.

In addition, light (e.g., video footage 202 emitted by the projector system 200) may intersect particles of water (e.g., water droplets 102), a portion of the light 202 may be reflected by the water 102 while another portion of the light 202 may pass through the water (and be refracted due to the differences of indices of refraction between water and air). Accordingly, it is preferred that regardless of how the water 102 may be delivered, and regardless of its shape or form, the water 102 may include water particles (e.g., droplets), or combined water particles (e.g., combined to form streams, fans, funnels, blooms or other forms) that may include adequate surface areas (individually or in aggregate across all of the water 102) for an image to be projected onto and be discernible by a viewer of the water 102. That is, it is preferable that the general mass of flowing water 102 provides a rough equivalent of a screen with integral movement, onto which the projected video 202 may appear. In this way the viewer may see the falling or flowing water 102 as well as the projected video footage 202 that may be reflected by the falling or flowing water 102. It is understood that if the delivered materials include other types of forms such as solids (e.g., sand or pebbles) or gasses, that the solids or gasses may also provide an adequate screen onto which the video may be projected onto.

Figure 5:
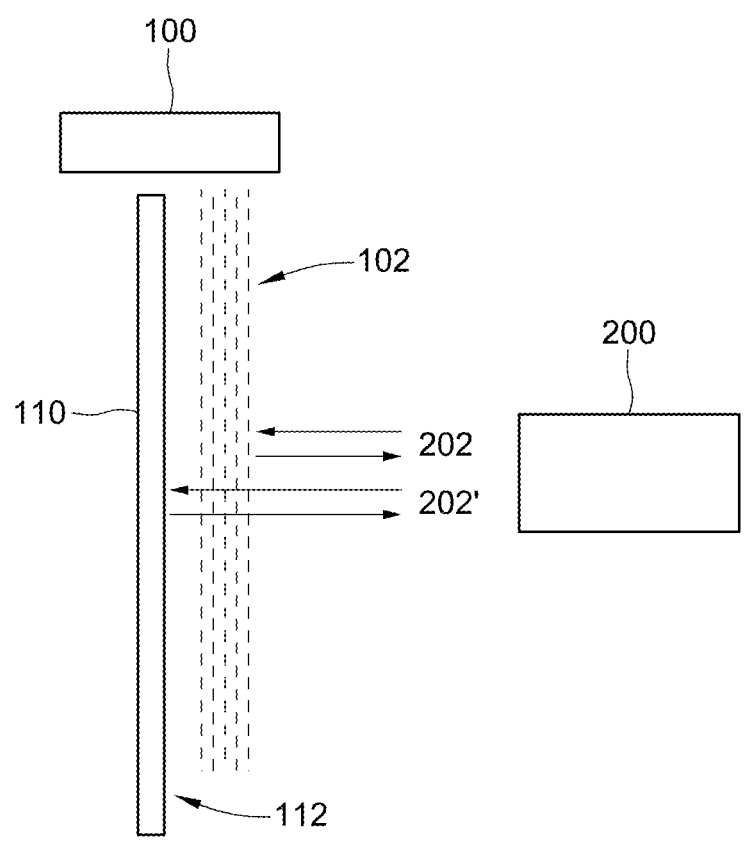
FIGS. 5-9 show aspects of an optically enhanced display according to exemplary embodiments hereof.

Also, as shown in FIG. 5 and according to exemplary embodiments hereof, the material delivery system 100 may include a backdrop 110 that may include a reflective surface 112. The reflective surface 112 of the backdrop 110 may be positioned on the opposite side of the delivered water 102 from the projector system 200 such that the portions of the projected video footage 202' that may pass through the water 102 may be reflected off of the reflective surface 112 of the backdrop 110 and back through the water 102 to the viewer. In this way, the reflected video footage 202' off the backdrop 110 may combine with the projected video footage 202 (reflected off the water 102) to form an image of higher intensity. The reflective surface 112 may be planar or may include curvatures (e.g., may be concave) or lenses so that it may compensate for the refraction of the light through the particles of water 102.

In another exemplary embodiment hereof, the system 10 may utilize naturally delivered water 102 in the form of falling rain, a naturally occurring waterfall, a naturally occurring stream of water, or other types of naturally occurring water forms. It is understood that the system 10 may also utilize a combination of naturally occurring delivered water 102 as well as water 102 delivered by the materials delivery system 100. The projector system 200 may also be used with solid objects and other moving forms besides water.

Projector System

In a preferred embodiment hereof, the system 10 may include a projector system 200 that may project video footage 202 onto the delivered water 102 as shown in FIG. 1, or onto other materials, objects or forms.

Figure 6:
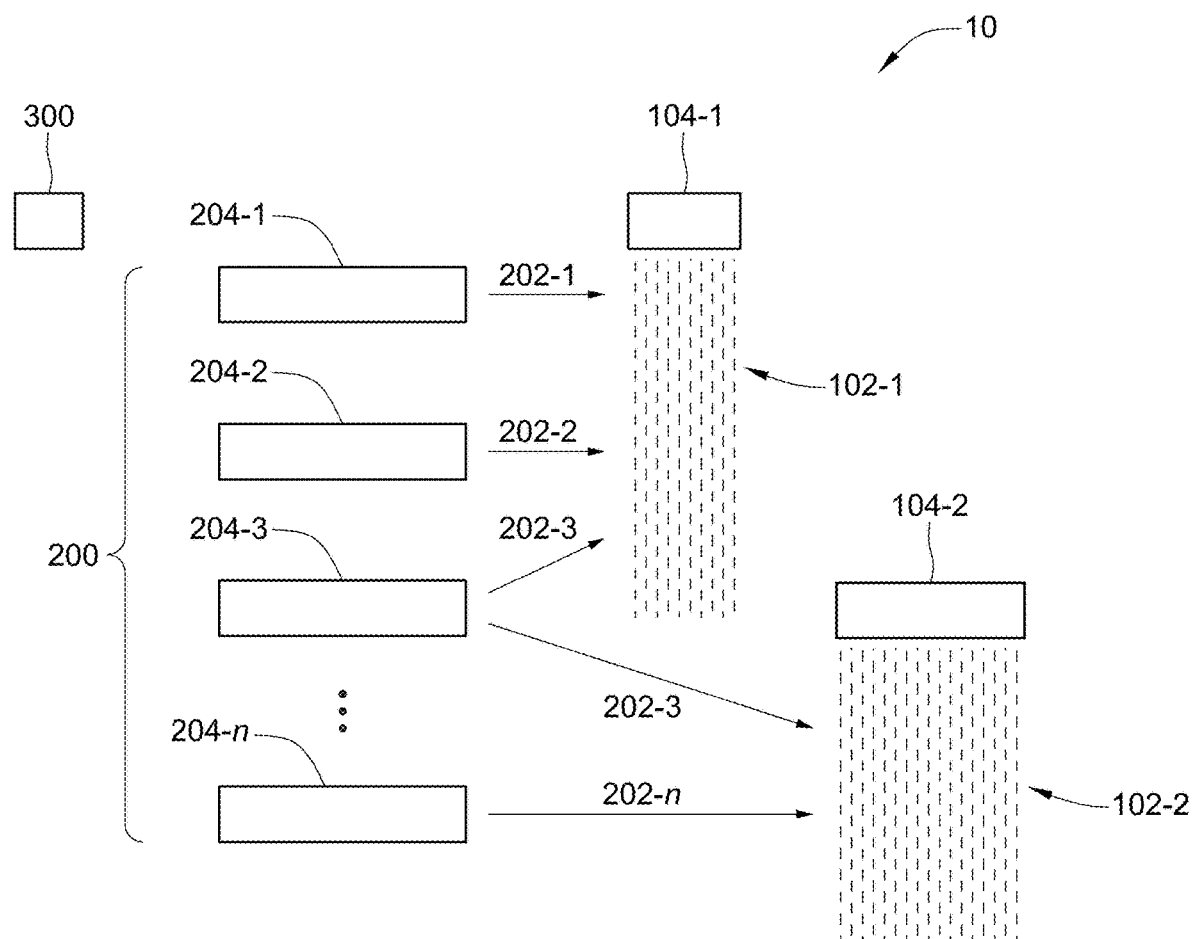

For example, the projector system 200 may include one or more multimedia projectors 204-1, 204-2, . . . 204-*n* (collectively and individually 204) as shown in FIG. 6. The multimedia projectors 204 may include any type of multimedia projectors 204 including but not limited to video projectors 204. The projectors 204 may be digital devices, analog devices or any combination thereof.

The projector system 200 and/or the projectors 204 may receive multimedia signals (e.g., video signals) from the controller 300 and may convert the signals to video and project the video 202 onto the delivered materials such as the delivered water 102, solid materials or other objects or forms. As will be described in other sections, the video footage may be captured in a variety of ways. The video footage 202 may be modified, manipulated or otherwise altered by the controller 300 prior to sending the video 202 to the projectors 204. For example, as described above, the controller may be programmed to slow down or speed up the video footage 202 so that its projection onto the water 102 may cause the water 102 to appear to slow down or speed up in mid-air. This will be described in further detail in other sections.

The signals may include, without limitation, video signals, animation signals, lighting signals and other types of signals. The projection system 200 and/or the projectors 204 may receive the signals from the controller 300 via wireless communication technologies such as WiFi, Bluetooth, cellular technology, RF and other wireless technologies, through transmission lines, wires or cables, or by any combination thereof.

As shown, some projectors 204 may project video footage 202 onto the same delivered water 102 (e.g., projectors 204-1, 204-2 and 204-3 may project video footage 202-1, 202-2, 202-3 onto water 102-1), some projectors 204 may project video footage 202 onto different delivered water 102 simultaneously (e.g., projector 204-3 may project video 202-3 onto water 102-1 and 102-2 at the same or different times), or any combination thereof. Each projector 204 may be orchestrated, choreographed and/or synchronized with each other projector(s) 204, and with each water delivery device 104. In this way, the material delivery devices 104 may release the water 102 in a choreographed fashion with respect to each other materials delivery device(s) 104, and the projectors 204 may project video footage 202 onto the water 102 in a synchronized and orchestrated fashion with respect to the released water 102.

In a preferred embodiment, the projectors 204 may project video footage 202 of high resolution so that the video 202 may be clearly discernable. As an alternative, the projectors may project video footage 202 to solid and other materials or forms besides water. High definition is not necessary as well.

In addition, it is preferred that the projectors 204, as well as the beams of light that the projectors 204 may emit, may be hidden from view so that the viewers of the water 102 may not notice the projectors 204, and may not perceive that the water 102 is reflecting projected video footage 202. The projectors 204 may be hidden using one-way mirrors or shades, by disguising the projectors 204, through the use of reflectors to bounce the video 202 through different paths to the water 102, and in other ways. In this way, as the water 102 may be visually altered by the projected video 202 (e.g., is caused to visually slow down, speed up, change directions, etc.), without the viewer discerning how this is being accomplished. Accordingly, the system 10 may provide enhanced and artistic effects for a very entertaining experience to the viewers.

Figure 7:
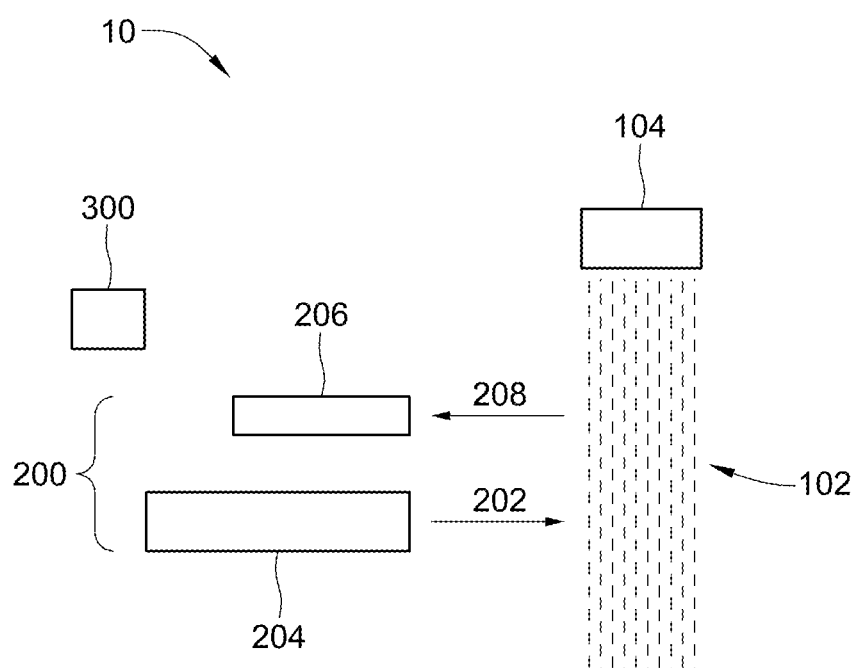

The video footage 202 may be captured or otherwise obtained in a variety of ways. For example, in one exemplary embodiment hereof as shown in FIG. 7, the projector system 200 may include one or more video capturing devices 206 (e.g., video cameras) that may be configured to capture video footage 208 of the delivered water 102 and supply the video footage 208 (in the form of a video signal) to the controller 300. The controller 300 may then alter the footage 208 as desired and provide the altered video footage 208a (in the form of a video signal) to the projector 204 to be projected onto the water 102 as the video 202. The video capturing device 206 may communicate with the controller 300 via wireless communication technologies such as WiFi, Bluetooth, cellular technology, RF and other wireless technologies, through transmission lines, wires or cables, or by any combination thereof. In addition, the video capturing device 206 may be an analog device, a digital device or any combination thereof.

Note that the video capturing methodology described above may facilitate visually manipulating delivered water 102 that may be delivered in a continual steady state, such as continuously falling rain droplets 102, a continuous falling curtain of water 102, continuous water 102 flowing down a structure, or in other ways that may be continuous and generally in a steady state. In this case, it may not be necessary to map the projected video footage 202 of the water particles onto the actual particles 102, as both the projected 202 and the real fields of particles 102 may be generally uniformly distributed.

In addition, a length of video 208 may be captured and stored for later use, and the time lapse between the capturing of the video footage 208, the altering the video footage by the controller 300, and the projecting of the same video footage 208 onto the water 102 at a later time may not adversely affect the desired visual outcome because the water 102 may remain in the continual steady state during the time lapse. That is, the water 102 may be generally in the same form at the time of the capturing of the video footage 208, and again later at the time of the video projection 202.

However, where the delivered water 102 reflects a changing or non-steady state form of water 102 (e.g., if the water 102 may be released in sporadic surges or may include frothy wave fronts running down a surface), the flow 102 may be unsteady and there may be varied spaces between the waves 102. This may require either very precisely timed wave 102 releases, actually filmed, and then synchronized to the water waves, or else real time creation and/or manipulation of the to-be-projected wave fronts 202. In this case, because the precise release of physical waves 102 in identical water flows and amounts may be difficult to achieve, a methodology of creating and/or manipulating the to-be-projected video footage 202 in real time just prior to the moment of its projection onto the water 102 may be used.

In one embodiment of this type, the video footage 208 may be captured and immediately altered and projected back onto the water 102 in real time. However, it can be seen that the video capturing device 206 may capture footage not only of the flowing water 102, but also of any video 202 that may be projected onto the flowing water 102 at the same time. That is, the projector(s) 204 may be projecting video 202 onto the flowing water 102 at the same time that the video camera(s) 206 may be capturing new footage 208. The new footage 208 may therefore include both the real delivered water 102 plus the projected video 202, and this new footage 108 may then be projected back onto the water 102. This may create an open positive feed-back loop of ever increasingly brighter light that may ultimately wash out the recorded footage 108.

In this case, it may be preferred to record the footage 108 of the flowing water 102 in non-visible light (e.g., infrared) using a non-visible light recording device 206. In this way, the non-visible light recording device 206 may only capture images/video of the delivered water 102 in infrared light, and not the images/video of the projected video 202. The non-visible light footage may then be converted to visible imagery (e.g., by the controller 300), modified as desired (e.g., slowed down, sped up, change the trajectory, etc.) and projected back onto the water 102 in real time or near real time.

It is not necessarily required to capture actual video footage 208 of the flowing water 102, and computer generated images, video or animations may be used as the projected video 202 instead. For example, computer graphical software may allow for the creation of virtual images of falling rain, which can then be projected onto the water 102 by the projectors 204. In addition, the virtual rain drops may be enlarged or reshaped to provide an enhanced effect, may be colored, or may include added graphical effects. In one example, the virtual rain may gradually or abruptly turn into sparks, flames, fireworks, or other pointillist objects, all at varying speeds and trajectories. In one example, imagery of fire could be created in a fan shaped array and projected onto the water spray 102, again at varying speeds. And if the fan is rotated or twisted and the computer generated imagery is created to follow the outline of the resultant morphed fan shape of water 102, the same effects as described above can be achieved. The computer generated videos may be designed to follow the curvature or motion of the flowing water 102, the structure 108 upon which the water 102 may flow, or even the movement of the water delivery devices 104.

In addition, the environment in which the system 10 resides may include different types of lighting which may influence the functionality of the system 10. For instance, if the system 10 is placed in an environment where the ambient light is considerably brighter than the projected brightness, the perceived motion of the water 102 may be biased towards the actual speed of the falling water 102. However, if the system 10 is placed in an environment with lower ambient lighting, the lower ambient lighting allows the projected video 202 to have a greater influence on the perceived motion of the visually altered water 102, thereby biasing the visual effect towards the projected video and motion associated therewith.

Controller

In a preferred embodiment hereof, the system 10 may include a controller 300 configured to send data to and/or receive data from the material delivery system 100, e.g., water delivery system 100, and the projector system 200. The controller 300 may include one or more microprocessors, microcontrollers, encoders, local or remote computers, smartphones, tablet computers, laptops, personal computers, hubs, servers or any other types of controller or any combination thereof. The controller 300 may include software, firmware, applications, programs, scripts or other types of code that may allow the controller 300 to run and perform its functionalities. The controller 300 may include drivers to control the different systems 100, 200, and may be networked, paired or otherwise configured with one or more of the systems 100, 200 as required. The controller 300 may communicate with one or more of the systems 100, 200 via wireless technologies, Wi-Fi, Bluetooth, RF, microwave, optical, cellular or other types of wireless technologies. Alternatively the controller 300 and the systems 100, 200 may communicate via transmission lines, wires, cables, or via any combination thereof.

The controller 300 may provide one or more of the following functionalities:

1. Interface with the materials delivery system 100 to control, operate, coordinate, orchestrate, synchronize, choreograph and otherwise manage the delivery of the water 102 or other material or object. This may include controlling one or more materials delivery devices 104 simultaneously and in parallel.

2. Interface with the projector system 200 to control, operate, coordinate, orchestrate, synchronize, choreograph and otherwise manage the capturing of video footage of the water 102, the modification and/or alteration of the video footage of the water 102, and the subsequent projection of the video footage 202 onto the water 102. This may include controlling of one or more projectors 204 and/or one or more video capturing devices 206 simultaneously and in parallel.

3. Provide an interface for the user of the system 10 to program, set, or otherwise control the functionalities described in (1) and (2) above.

4. Coordinate the functionalities of the system 10 with music, lighting and other visual elements to create an expanded multimedia presentation.

5. Interface with other displays (e.g., other water displays), installations, programs or systems to correlate the functionalities of the system 10 with said other systems.

6. Control the aforementioned systems 100, 200 depending on the type of material or object used, e.g., water, solid, etc.

The functionalities of the controller 300 described above are meant for demonstration purposes. The controller 300 may include the same, similar or other types of functionalities described above or otherwise. It should also be noted that the system 10 is not limited in any way by the functionalities of the controller 300.

In Use

Aspects of the system 10 will next be described by way of several embodiments of the current invention in use. The examples provided below are chosen to illustrate different types or combinations of visual experiences that the system 10 may provide to viewers. Each example may purposely demonstrate particular operational functionalities of the system 10. The examples presented do not limit the scope of the system 10 to the specific functionalities described herein, and the system 10 may include other functionalities or combinations of functionalities that may not specifically be demonstrated in the examples but that are within the scope of the invention.

Figure 8:
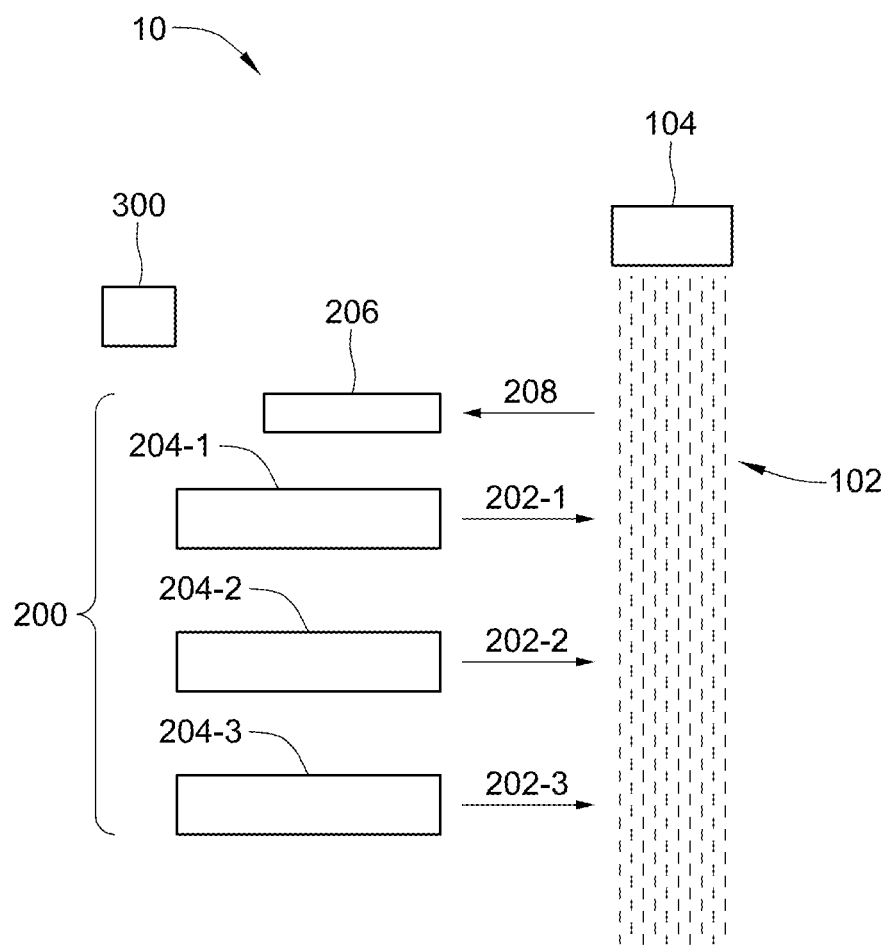

In a first example as depicted in FIG. 8, three projectors 204-1, 204-2, 204-3 may each project different video images 202-1, 202-2, 202-3 respectively onto three different portions of a curtain of falling water droplets 102. In this example, because the delivered water 102 may be a continuous steady-state of falling droplets 102, a length of video footage 208 of the water 102 may be captured prior to the visual effect being provided to observers by using a video camera 206 and stored in the controller's memory. The video footage 208 may then be altered and/or modified as desired and stored as one or more altered sequences. While FIG. 8 shows one video camera 206 capturing video footage 208, any number of video cameras 206 may be used to capture different sequences of video 208 from the same or from different perspectives and/or orientations with respect to the water 102 and the projectors 204 as necessary. For example, each projector 204 may have a dedicated video camera 206 associated with it to capture video footage 208 specifically for that projector 204.

In this example, a first sequence of video footage 208 may be altered by the controller 300 to depict the rain droplets as falling at a rate of half the speed of the normally falling rain 102. This altered footage may be stored to be projected as video 202-1. A second sequence of video footage 208 may be altered by the controller 300 to depict the rain droplets as falling at a rate of twice the speed of the normally falling rain 102. This altered footage may be stored to be projected as video 202-2. And a third sequence of video footage 208-3 may be altered by the controller 300 to depict the rain droplets as falling at the normal speed of the falling rain 102 but at an offset angle of 45° with respect to the downward trajectory of the normally falling rain 102. This altered footage may be stored to be projected as video 202-3.

During use, but not while the visual image of the water 102 is being altered, an unaltered sequence of the video 202 may be projected onto the water 102. In this way, the viewers of the water 102 may see the visually unaltered water 102 with a lighting intensity that includes the intensity due to the ambient light of the environment as well as the added intensity due to the projected video 202. Then, when the altered sequences of video 202 are applied to the water 102 instead of the unaltered sequences, the light intensity of the water 102 may not change. However, it is understood that this may not be necessary and that an unaltered video sequence 202 may not necessarily be projected onto the water 102 if not desired. In this case, the falling water 102 may first be displayed to the viewers with no projected videos 202.

In this first example, the viewers may first see the falling water 102 as a standard water display (with no visual alterations). Then, in a sequential implementation, the projectors 204 may project altered video footage 202 onto the water 102. For example, the first projector 204-1 may first project the altered video 202-1 onto the upper portion of the falling water droplets 102. This may alter the visual appearance of the upper section of water 102 to be seen as water droplets 102 slowing down in mid-air. Shortly thereafter, the second projector 204-2 may project the altered video footage 202-2 onto the middle portion of the falling water droplets 102. This may alter the visual appearance of the middle section of the water 102 to be seen as water droplets 102 speeding up in mid-air. Then, the third projector 204-3 may project the altered video footage 202-3 onto the bottom section of the falling water droplets 102, and this may alter the appearance of the bottom portion of water 102 to be seen as water droplets 102 being driven to the side at a slanted trajectory.

The system 10 may apply the above affects to the falling water 102 in succession and then return to normal (with projections of unaltered video 202 or no projections 202). In this way, the short visual change in appearance of the falling water 102 (the slowing down, the speeding up and the slanted trajectory) may catch the attention of the viewers and then return to normal, causing confusion, curiosity and wonderment regarding what they may have just witnessed.

Continuing on with the same example, the system 10 may then begin projecting the altered video footage 202 onto the falling water 102 but in different sequences and to different portions of the water 102. For example, the first projector 204-1 may project the altered video 202-3 of the sideways trajectory, the second projector 204-2 may project the altered video 202-1 of the slowed down water, and the third projector 204-3 may projected the altered video 202-2 of the sped up water. In this way, the visually altered falling water 102 may again catch the attention of the viewer(s) but this time the sequences may be different causing further confusion, curiosity and awe.

Figure 9:
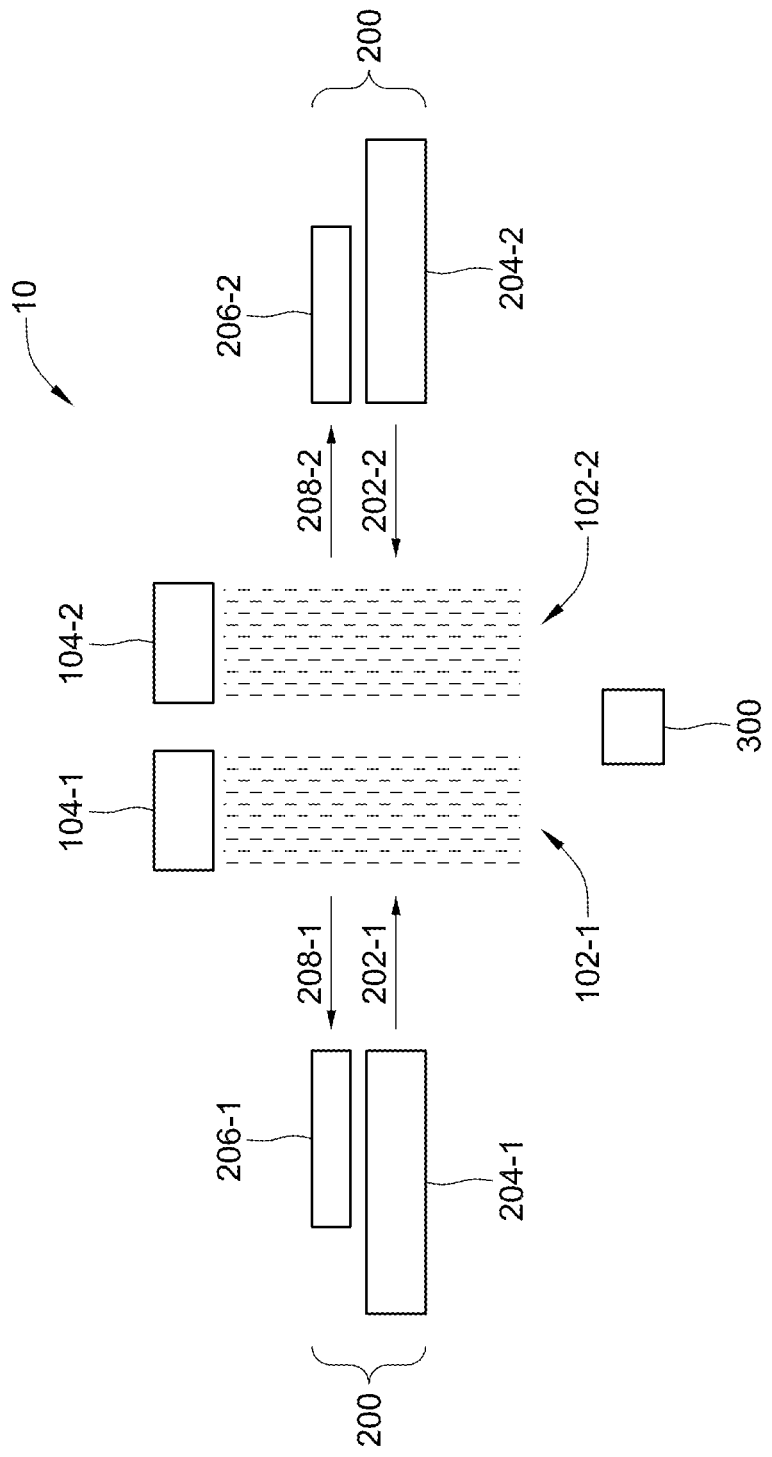

In a second example as shown in FIG. 9, a first video capturing device 206-1 may be configured with a first projector 204-1 and a first water flow 102-1, and a second video capturing device 206-2 may be configured with a second projector 204-2 and a second water flow 102-2. In this way, the first video capturing device 206-1 may capture a sequence of video 208-1 of water 102-1, and the video sequence 208-1 may be altered and projected back onto the water 102-1 as video 202-1 by the projector 204-1 to visually alter the water's 102-1 appearance. At the same time, the second video capturing device 206-2 may capture a sequence of video 208-2 of water 102-2, and the video sequence 208-2 may be altered and projected back onto the water 102-2 as video 202-2 by the projector 204-2 to visually alter the water's 102-2 appearance.

In this example, the delivered water flows 102-1 102-2 may include any type of forms (e.g., curtains of water droplets, water streams, fans, funnels, blooms, waterfalls, etc.), and it may be preferable that the water forms 102-1, 102-2 be positioned in close proximity to one another (e.g., side-by-side). In this way, the video footage 208-1, 208-2 may each be altered in a way that may result in depicting the water flows 102-1, 102-2 as interacting within one another (e.g., bumping one another, dancing with one another, etc.).

For example, video footage 208-1 may be modified such that the projection of video 202-1 may affect the visual downward trajectory of the water 102-1 as suddenly shooting sideways in the direction of the water 102-2 and then returning to its normal trajectory. This may appear as a "hip bump" from water 102-1 to water 102-2. The water 102-2 may then be depicted as reacting to the "hip bump" from water 102-1. For instance, the first reaction from water 102-2 may be to slow down its downward flow due to the bump. To create this effect, the video footage 208-2 may be modified to slow down such that the projection of the video 202-2 onto the water 102-2 may visually affect the water 102-2 in the same way (e.g., it may appear to stall in mid-air for a moment). Then, the water 102-2 may be shown to react to the hip bump from the water 102-1 by giving the water 102-1 an even larger hip bump. In this case, the video footage 208-2 may be altered to depict an even larger sideways trajectory towards the water 102-1 and then returned to its normal trajectory. It can be seen that this playful interaction may continue between water 102-1 and water 102-2 in a variety of different sequences.

Continuing with this second example, the visual appearances of the water 102-1 and 102-2 may also be altered simultaneously and in real time such that the water flows 102-1, 102-2 may appear to be dancing with one another. In this case, the video capturing devices 206-1, 206-2 may each capture videos 208-1, 208-2 respectively and simultaneously, the videos 208-1, 208-2 may each be altered individually, and the projectors 204-1, 204-2 may each project the videos 202-1, 202-2 respectively and simultaneously onto the water flows 102-1, 102-2. The simultaneous projections 202-1, 202-2 onto each water flow 102-1, 102-2 may be chosen so that the changes in the visual appearances of the water flows 102-1, 102-2 may be choreographed with one another in real time.

For example, the visual appearance of the water flows 102-1, 102-2 may be affected simultaneously to show the water droplets 102-1 as slowing down while the water droplets 102-2 may speed up. The affects may then be changed such that the droplets 102-1, 102-2 may both show as being suspended motionless in mid-air. The affects may then switch again to show the trajectories of the water droplets 102-1, 102-2 as reversing in opposite directions, as shooting into one another, shooting apart, etc. It can be seen that any type of effects may be applied to the water flows 102-1, 102-2 in a simultaneous choreography such that the water flows 102-1, 102-2 may be perceived to interact with one in any way.

The system 10 may be used by itself and provide the visual effects to observers. Alternatively, the visual effects may be incorporated into or used with water and lighting displays having other visual, audio and other effects. To this end, the visual effects provided by the system 10 may complement other effects provided by the display. The system 10 may be added to existing displays or included in the design of a display being developed.

Embodiments of a system or display 1010 involving aspects of the current inventions discussed above and below are now described with references to FIGS. 10-16. Display 1010 may comprise various features and structures, such as those described above alone and/or combined with other types of displays and features. The size and/or overall configuration of display 1010 may vary. For example, display 1010 may be relatively small so as to be viewed by a few observers in close proximity. Alternatively, however, display 1010 may be relatively large so as to cover a significant area, thereby allowing observers to walk in or around the display and/or view various features from a distance.

Figure 10:
FIG. 10 shows part of a display embodying aspects of the current invention, during the daytime.
Figure 11:
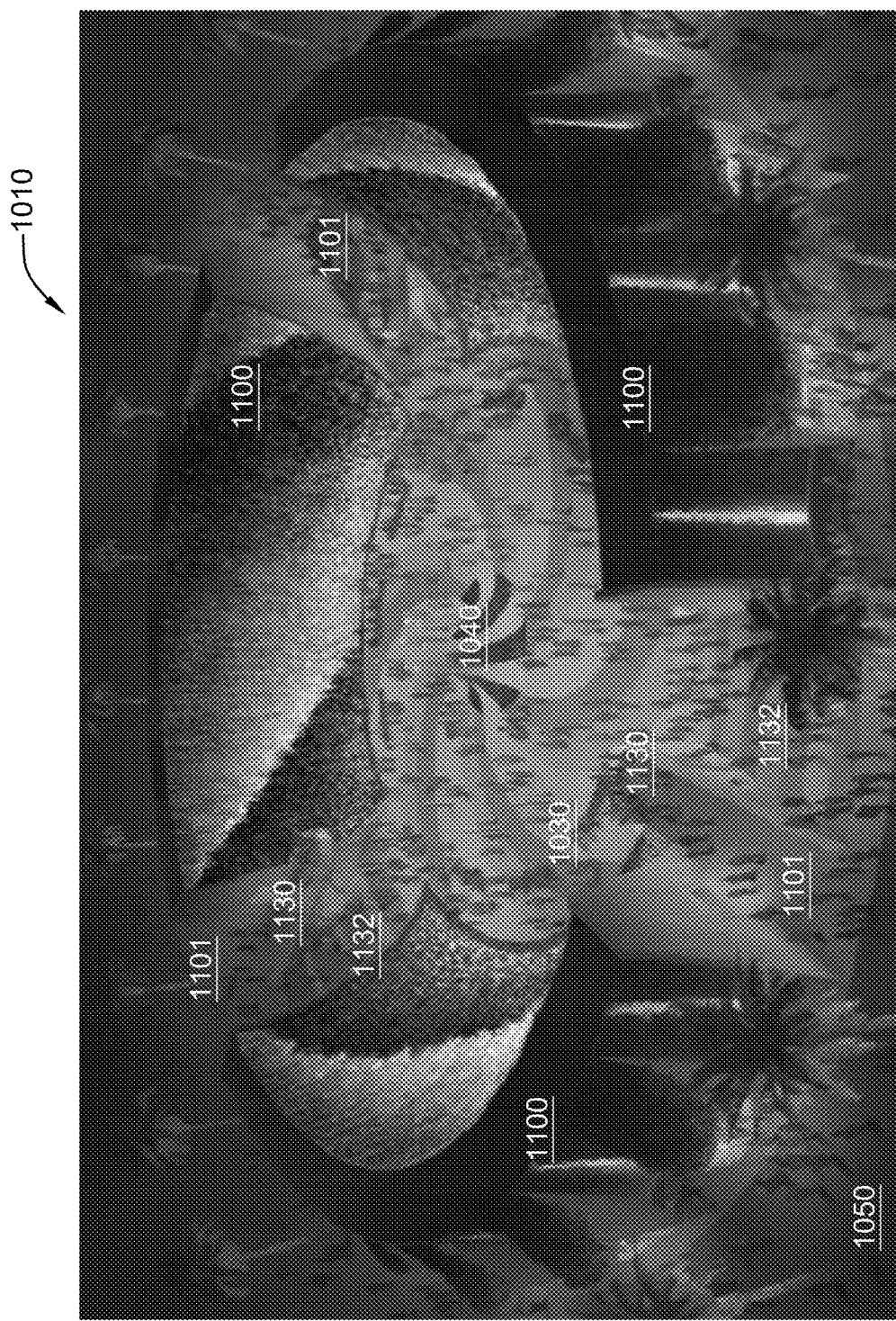
FIG. 11 shows a display embodying aspects of the current invention, during the nighttime.

FIGS. 10 and 11 show an embodiment of display 1010 during the daytime and nighttime. As shown, this embodiment is relatively large; allowing observers to walk amongst its features and providing an arena or stadium environment. However, the display of the current invention may be smaller and/or configured differently. Display 1010 may include features and effects, along with the structure to provide a projection mapping feature as described above, and as described further below.

Display 1010 may include several primary systems: one or more sections 1100 which deliver material (e.g., water); a projection system 1200 which may capture video footage of the water, project modified video footage (based on modifications or alterations of the captured video footage) back onto the water and/or project other images or video onto the water; and a controller 1300 which may modify the captured video footage and perform other control functions over different aspects of display 1010.

Sections 1100 are now further described. Display 1010 may include one or more sections, features, delivery systems or portions 1100, such as the three sections or water delivery systems 1100 shown in the figures. Section, feature or portion 1100 may generally comprise structure 1108 which may be configured to accommodate the overall display 1010. In the embodiment of FIGS. 10-11, each structure 1108 may include walls 1109 and other structural components, of varying scale, height, width, shape and other dimensions or characteristics. For example, structures 1108 may be sized to resemble buildings.

Structures 1108 may include a frame or other support structures that support walls 1109 and/or other aspects of structure 1108. As shown in FIGS. 10-11, structures 1108 of features 1100 may be spaced around or in proximity to plaza 1030. One or more of the sections, features or portions 1100 may be separated by walkways, stairways, gaps or other openings 1101, which may provide observers with access to view the features of display 1010 from within display 1010 or in proximity or outside thereof. For example, opening 1101 may include observation platform or deck 1130 and stairway 1132. However, other configurations of sections or features 1100, and openings 1100, are within the scope of the current inventions. As discussed in more detail below, Structure 1108 may generally include top section 1120 which may house or support other components as discussed later. Structure 1108 may also include surface 1106 which extends downward from top section 1120 in a parabolic, curved or other sloped configuration, and along or down which water or other materials 1102 may flow. Surface 1106 may comprise one or more panels joined together. Alternatively, surface 1106 may be formed when concrete is poured or when other material(s) is/are deposited to form structure 1108. In the embodiment of FIGS. 10-11, water 1102 is delivered to and flows down surfaces 1106, and surfaces 1106 are inward-facing towards plaza 1120. Where display 1010 involves water, surface 1106 is preferably finished to be waterproof.

Surface 1106 may include a texture that may be molded or formed therein as structure 1108 is constructed. As an alternative, a texture may be applied to surface 1106. A texture to surface 1106 preferably causes the water 1102 flowing down to aerate or flow with turbulence, and become more opaque as it travels down the surface 1106. As discussed above, and as discussed in more detail below, the opacity of water 1102 may more effectively interact with projected video footages or images to facilitate providing the visual effects of display 1010.

Figure 13:
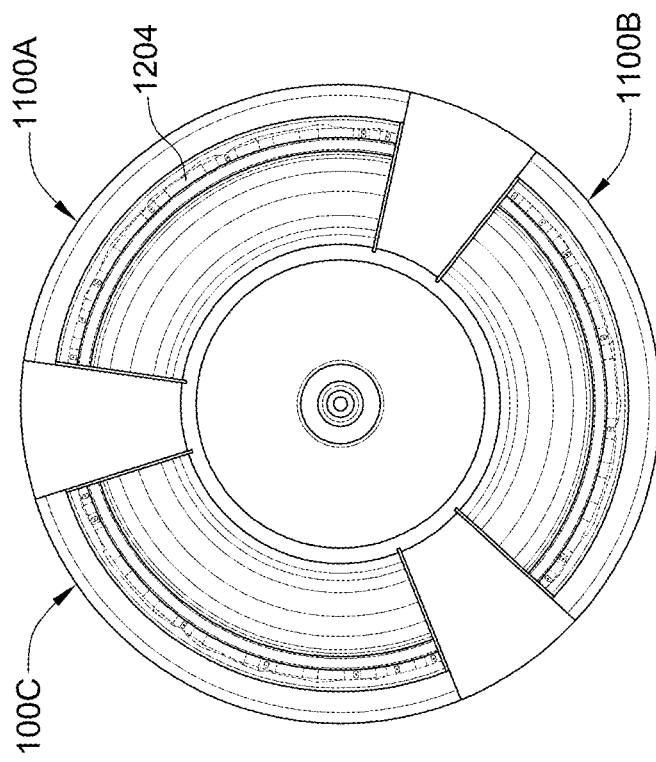
FIG. 13 is a plan view of a display structure and other display components.
Figure 12:
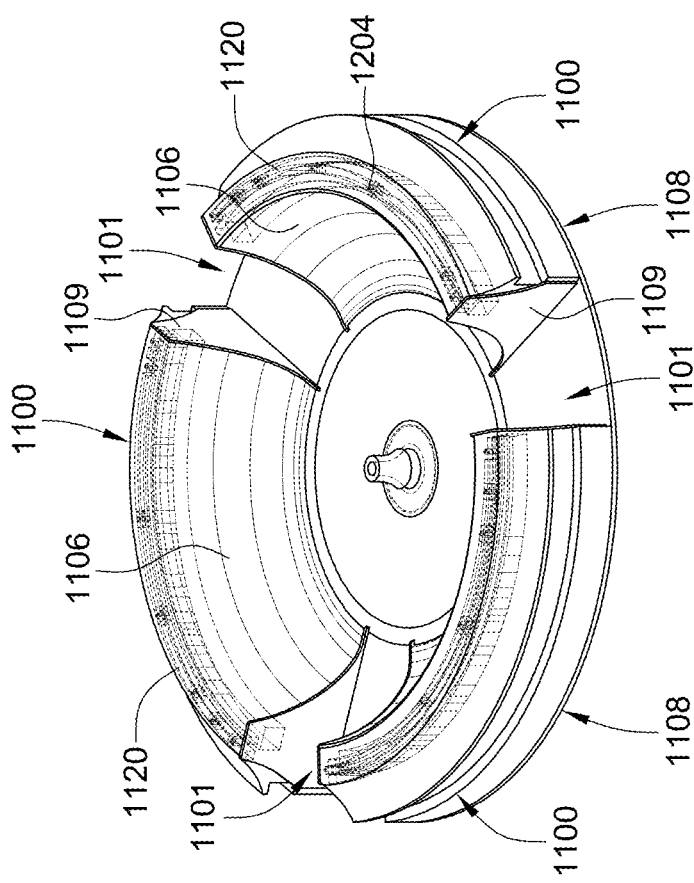
FIG. 12 is an isometric view of a display structure and other display components.
Figure 14:
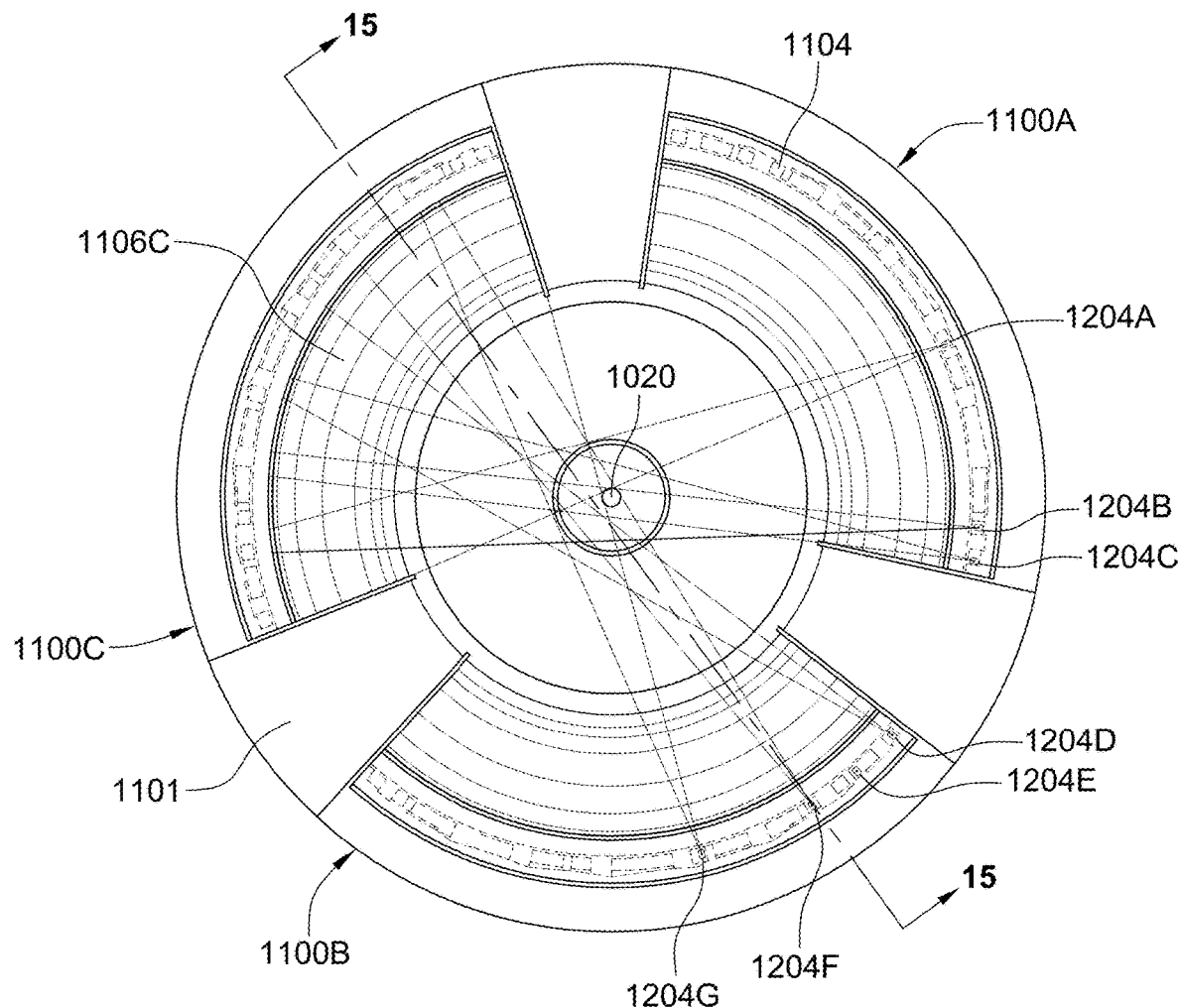
FIG. 14 is a plan view of a display structure showing projector locations and associated projections.

Section 1100 may include one or more material delivery devices or assemblies 1104 that may deliver water or other material to flow down surface 1106. In the embodiment of FIGS. 12-14, delivery devices 1104 may be positioned along the top of wall 1109, or along the top of structure 1108. As an example, these delivery devices 1104 may comprise boxes, which fill with water, and from which the water 1102 is ejected up and forward (as shown in FIG. 3).

Figure 16:
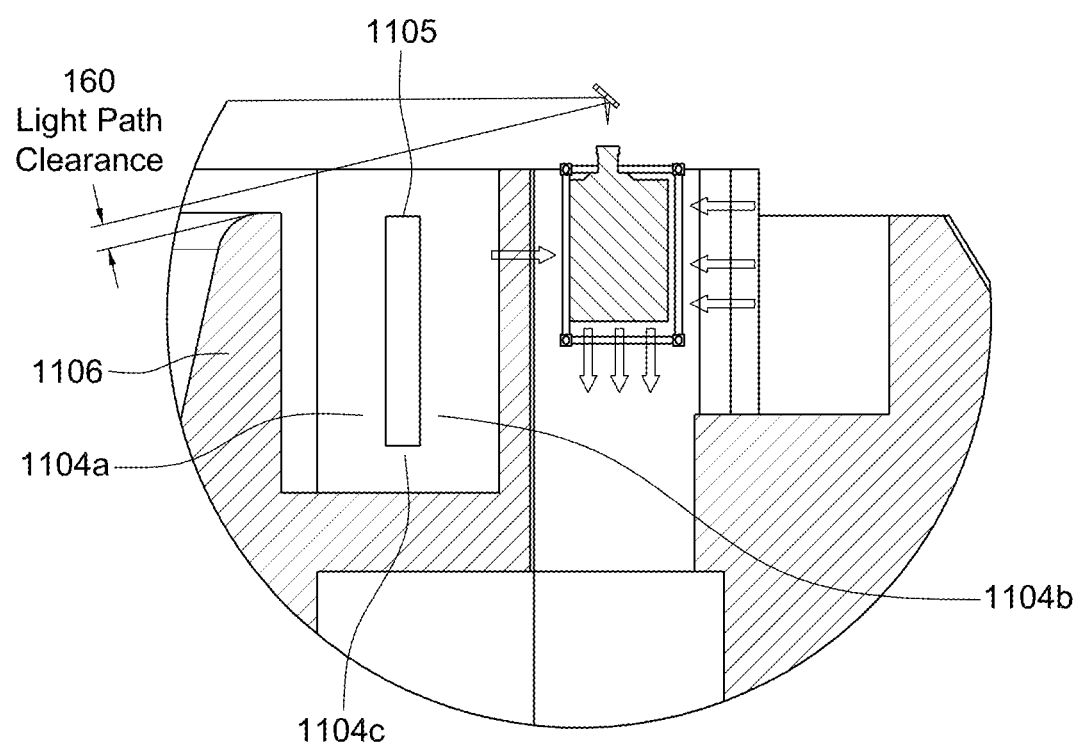
FIG. 16 is a side section view of a projector and other display components.

As shown in the section view of FIG. 16, box 1104 may include a partition 1105 that extends along the length of box 1104, and that may effectively divide the interior of box 1104 into an inner and outer chambers 1104a, 1104b. A gap 1104c may exist between the bottom of partition 1105 and the bottom of box 1104. Compressed air may be fed into box 1104 at or near the top of outer chamber 1104b, thereby directing the water downward, through gap 1104c and then upward through inner chamber 1104a and out of box 1104. It should be noted that the compressed air that is fed into outer chamber 1104b need not serve to aerate the water in box 1104. Indeed, the water contained in box 1104 may generally flow in a laminar state through and out of box 1104. The water emitted from boxes 1104 may assume a turbulent state as it flows down walls 1106, without any the need for any device that affirmatively aerates the water. As discussed elsewhere, the turbulent state of the water flowing down walls 1106 may facilitate the reflection of infrared light off the water and recording thereof. Other types of delivery devices such as nozzles or manifolds may also be used to deliver water 1102 to surface 1106. These other types of delivery devices also need not serve to impart turbulence to the water prior to the water flowing down walls 1106. Other embodiments of the current invention may imply near infrared as opposed to infrared light, or other wavelengths of light. Accordingly, the reference to infrared light throughout the specification may alternatively refer to near infrared or other wavelengths of light, i.e., illuminated with radiation outside the visible spectrum.

As an example, which is not intended to limit the scope of the current invention, in the embodiment shown in FIGS. 10-14, display 1010 may include three sections 1100, where fifty one (51) or some other number of boxes 1104 may be installed along the top edges or top sections 1120 of each section 1100. Boxes 1104 may be one meter wide or some other suitable dimension. The boxes 1104 may be individually controlled to push water up and over the edge on programmed cues.

Projection system 1200 is now further described with reference to FIGS. 12-16. Projection system 1200 may include one or more projectors 1204 that may project video footage or other images 1202 onto water 1102. Projection system 1200 may also include one or more video cameras or other video capturing devices 1206 that may record video footage of the water 1102 as it flows down surface 1106. It is preferred that video projectors 1204 are relatively powerful so that they may sufficiently project their video and/or other images to reach the other side of display 1010 as discussed below.

Projectors 1204 may be positioned or distributed along top sections 120 of structures 1108. In the embodiment of FIGS. 12-14, top section 120 of each structure 1108 may include seven projectors 1204, so that display 1010 includes twenty one (21) total. However, other numbers of projectors 1207 may be used, and the current inventions are not limited to the embodiment shown in FIGS. 12-14.

Each projector 1204 may be aimed and focused on a surface 1206 of another section 1100. For example, projectors 1204 may be aimed and focused on opposite section(s) 1100, e.g., across plaza 1030. It is preferred that the light 1202 emitted from projector 1204 has sufficient lumens to form a discrete projection on the surface 1206 at which it is aimed.

Figure 15:
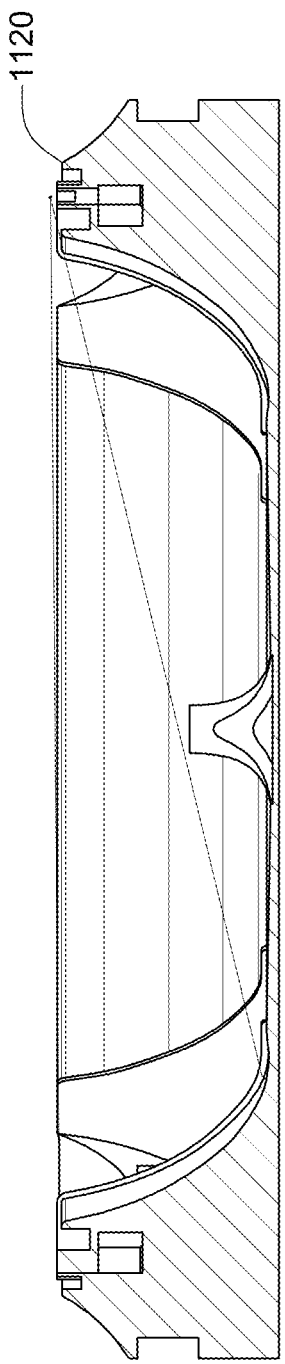
FIG. 15 is a side section view of a display.
Figure 15A:
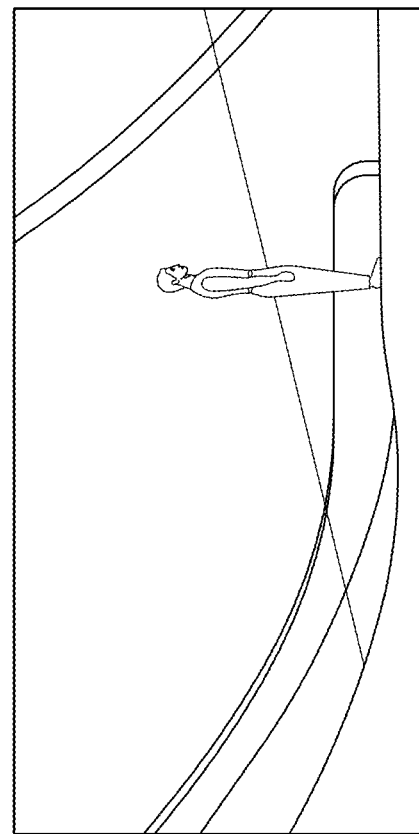
FIG. 15A is enlarged side section view of a part of a display.
Figure 17:
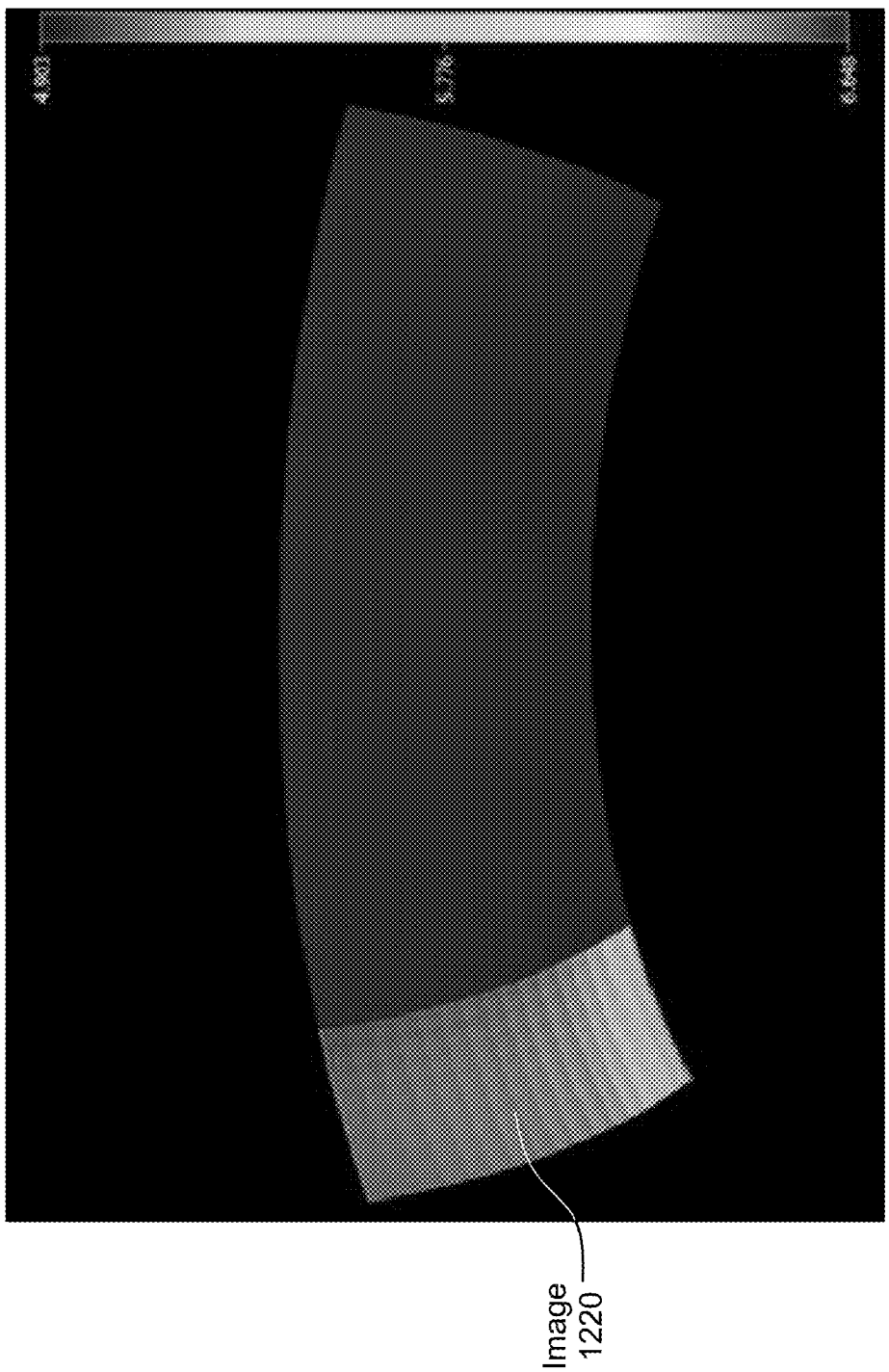
FIG. 17 shows part of a display structure with different intensity lighting.

The video footage or other image 1202 emitted from projector 1204 may comprise white light or a spectrum of colors. FIG. 17 shows an image 1220 comprising an individual colored field projected by a single projector 1204 onto the surface 1106 of a section 1100. As shown, image 1220 may be projected onto only part of surface 1106. The image 1220 shown on the left of wall 1106 may represent a screen, section or an area of wall 1106 that is covered by the projection from one of the projectors 1204. Successive projectors 1204 may project adjacent and/or overlapping screens onto adjacent and/or overlapping sections of wall 1106. These screens may be "stitched" or otherwise overlaid or coordinated together so that the overall image 1220 that spans the width of wall 1106 comprises the desired contiguous image. The stitching together of successive screens may occur through software. The intensity, e.g., in lumens/unit of area squared, of the projected image 1232 may vary depending on the location and curvature of surface 1106 a particular portion of the projected image may appear. Generally, portions of the projected image 1232 appearing near the bottom of wall 1106 may be projected with more lumens. To this end, FIG. 15A shows an example projection path that appears near the base of wall 1106 (where the human figure appears). Because wall 1106 at this lower section has a larger horizontal component in its curvature than for sections higher up on wall 1106, the projected image 1220 may be diffused. To address this situation, so that the resolution or brightness of the overall image 1220 appears consistent along the height of wall 1106, the image 1220 may be projected with more lumens per unit area squared for the bottom portion of the image. And higher up wall 1106, where the vertical component of the curvature is larger, the image 1220 may be projected with fewer lumens per unit area squared. This variation in brightness may be accomplished through software, e.g., through a software masking technique. For example, software may be used to process the digital representation of the image to be projected so that certain portions of the projected image are delivered brighter than other portions. This is discussed in more detail later on.

The manner in which projectors 1204 are positioned, and are directed and focused is now further described with reference to FIGS. 12-16. In the embodiment shown, display 1010 may include three sections 1100A, 11008, 1100C that may be separated by openings 1101. Each section 1100 may include a number of projectors 1204 aimed at the surface(s) 1206 of opposite section(s) 1100.

In the embodiment with twenty-one (21) projectors 1204, seven projectors 1204 may be aimed at a particular surface 1206, so that their collective projections cover the entire surface 1206, or desired portion thereof, i.e., the seven projectors 1204 may project an image or otherwise illuminate the entire surface 1206, or desired portion thereof. These projectors 1204 may be located on different sections 1100, while all aiming at desired portions of a particular surface 1206. As noted earlier, the screens provided by each of the projectors may be stitched together to form one contiguous image across the width of wall 1106.

FIG. 14 shows an example where projectors 1204A, 1204B, 1204C are located on section 1100A, and projectors 1204D, 1204E, 1204F, 1204G are located on section 1100B. In this embodiment, all projectors 1204A-G are aimed at different portions of surface 1106C of section 1100C, but the collective areas of their projections or expanding beams 1202 may cover the entire surface 1106C. Some portions of projections 1202 may be blended with portions of other projections 1202, while other portions of projections 1202 may not be blended. In general, adjacent projectors 1204 may project adjacent screens on the desired surface 1106. The manner in which the projections 1202 are combined and/or collectively project images onto surface 1106 is discussed in more detail later.

FIGS. 14A-14G provide more detail about how projectors 1204A-G are positioned on top portions 1120A, 1120B of sections 1100A, 1100B. As shown, each camera 1204 may be mounted and aimed so that the centerline of their projections 1202 may deviate from the display or facility axis 1020 by a desired angle. The angle of deviation may generally depend on where the projector 1204 is located in relation to surface 1106 it is aimed at. In any event, the projections 1202 from projectors 1204A-G collectively cover surface 1106C. The angles of deviation identified in FIGS. 14A-14G are examples only, and projectors 1204 may be mounted at other angles of deviation.

For clarity, FIG. 14 shows only the projections 1202 emitted by the seven projectors 1204A-G. In operation of the twenty-one (21) projector embodiment, however, the other fourteen (14) projectors would also emit projections 1202 onto surfaces 1106A, 1106B. The timing and content of the projections 1202 are discussed in more detail later, but it should be noted that an aspect of the current inventions relates to sequential or simultaneous projections 1202 being emitted from projectors 1204, and other types of visual effects.

The content transmitted to the projectors 1204 (that is then projected to wall 1106) may be divided into separate screens, with each screen covering a portion of wall 1106. In a preferred embodiment, seven projectors may be used to project portions of the overall image to the opposite wall 1106. As noted above, these seven projections may be stitched together to form the desired contiguous projected image across the width of wall 1106. Other numbers of projectors 1204 and screens may be used within the scope of the current inventions.

The operation of projectors 1204 is now further described. In general, projectors 1204 may receive video or other signals from a central server or controller 300 as shown in FIGS. 1 and 6-9, and based on these signals, projectors 1204 may project the desired content. Controller 300 may control the content to be projected as well as the timing of when such projections will be emitted. As such, controller 300 determines and coordinates the projected content 1202 so that the images or visual effect(s) 1220 appearing on one or more of surfaces 1106A, 1106B, 1106C are coordinated. To this end, it should be noted that the images or visual effects on surfaces 1106A, 11066, 1106C need not be the same, but may vary so as to provide an overall coordinated display.

The recording of video footage 1208 and the manner in which it is processed and provided to projector 1204, so that projected video footage 1202 may be projected onto surface 1106 is now further described, with reference to a single projector 1204 as an example. In this example, infrared technology may be used, though other embodiments need not use infrared. As described above, the projector 1204 may project or send projected video footage 1202 onto a specific area of an opposite wall 1106.

Figure 14A:
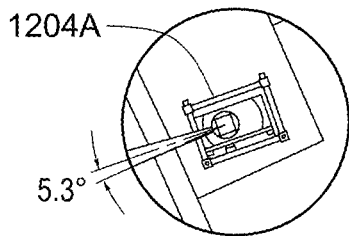
FIGS. 14A-G show projector and projection configurations.
Figure 14B:
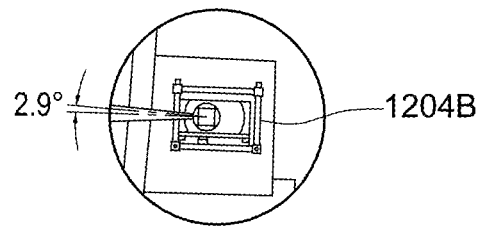
Figure 14C:
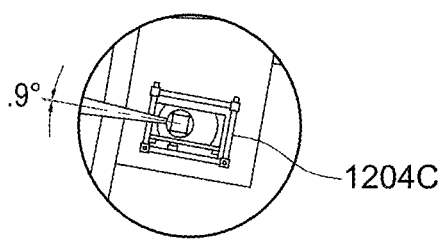
Figure 14D:
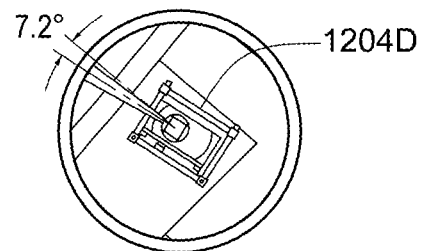
Figure 14E:
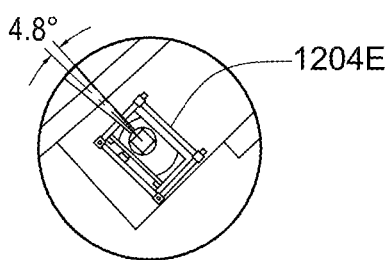
Figure 14F:
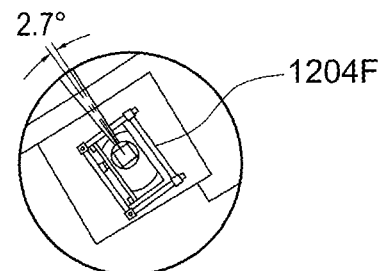
Figure 14G:
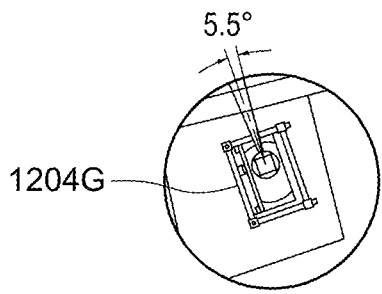
Figure 14A:
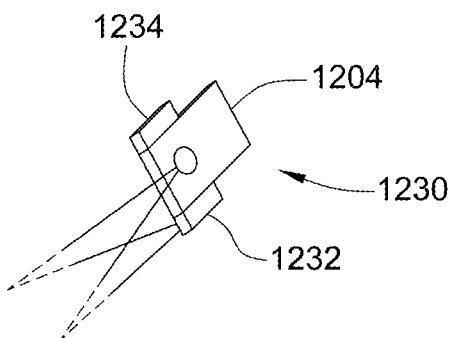

This preferred embodiment may include an infrared system 1230 associated with a projector 1204. More specifically, and as shown in FIG. 14AA, one or more infrared lights 1232 may be mounted on or next to projector 1204, and may be aimed or configured so as to bathe the desired section of wall surface 1106 the projector 1204 is focused on, in infrared light 1231. Depending on how closely infrared light 1231 is located relative to projector 1204, the axis of the infrared beam may be angled relative to the projection beam so that their beams generally coincide over the desired section of wall surface 1106. The focal lengths of the infrared light beam and the projection beam may also coincide, though this is not necessary. In other embodiments, an infrared light 1232 and infrared camera need not be associated with each projector 1204.

The infrared light field 1231 on the wall is generally not visible to a person because wavelengths of infrared light are generally not perceptible to the human eye. As such, the infrared light 1231 does not interfere with the visual effects and/or overall appearance provided by display 1010 to the observer.

The infrared light 1231 that illuminates the desired section of wall 1106 will provide an infrared image 1236 for recording. For example, where the infrared light 1231 illuminates water flowing down the desired section of wall 1106, and where that water flows down in an aerated or turbulent manner, the infrared light 1231 will interact with that water and thereby provide an infrared image or footage 1236 that may be captured or recorded. As noted above, this infrared image 1236 is generally not visible to the human eye.

Infrared system 1230 may also include infrared camera 1234 which may record the infrared image 1236 resulting from, e.g., the infrared light interacting with the water flowing down wall 1106. Though the infrared image is generally not visible to the observers' human eyes, infrared camera 1234 may "see" and record the infrared image 1236 on wall 1106 and whatever else is in its field that is illuminated by the infrared light 1231. As such, infrared camera 1234 may record captured infrared footage 1236, which may then be processed or altered to produce projected footage 1232 that is in the visible light spectrum and thus visible to observers. As discussed below, this footage 1236 that has been converted to from infrared to visible light may then be projected by projector 1204.

As noted previously, infrared camera 1234 may capture only those images/video resulting from the infrared light 1231 interacting with the delivered water (which images/video are not visible to observers), and not the images/video of the projected video 1202 (which images/video are visible to observers). As such, when the captured infrared footage 1236 is ultimately projected by projector 1204, after it has been altered as mentioned above and discussed further below, the projected footage 1232 is based only on the infrared footage 1236, and not visible light footage.

Infrared camera 1234 may be associated with the projector 1204. For example, infrared camera 1234 may be mounted to or located in proximity to projector 1204. Infrared camera 1234 is preferably focused on the same part of the wall 1106 that projector 1204 is focused on, so that the captured infrared footage 1236 is recorded from the same section of wall 1106 that the altered footage will be directed at by projector 1204.

As noted above, the captured infrared footage 1236 may be altered or modified so that it may ultimately be projected as converted/visible projected footage 1232 onto wall 1106. In general, this may occur by shifting the output of the infrared camera 1234 into the visible spectrum.

For example, the video signal from the infrared camera 1234 may be fed to a computer, such as controller 300 or central server 1300, that has been programmed to filter and/or modify the captured infrared footage 1236 so that it is useable for the next step, i.e., projecting converted/visible light footage 1232 onto the water flowing down wall 1106.

Figure 18:
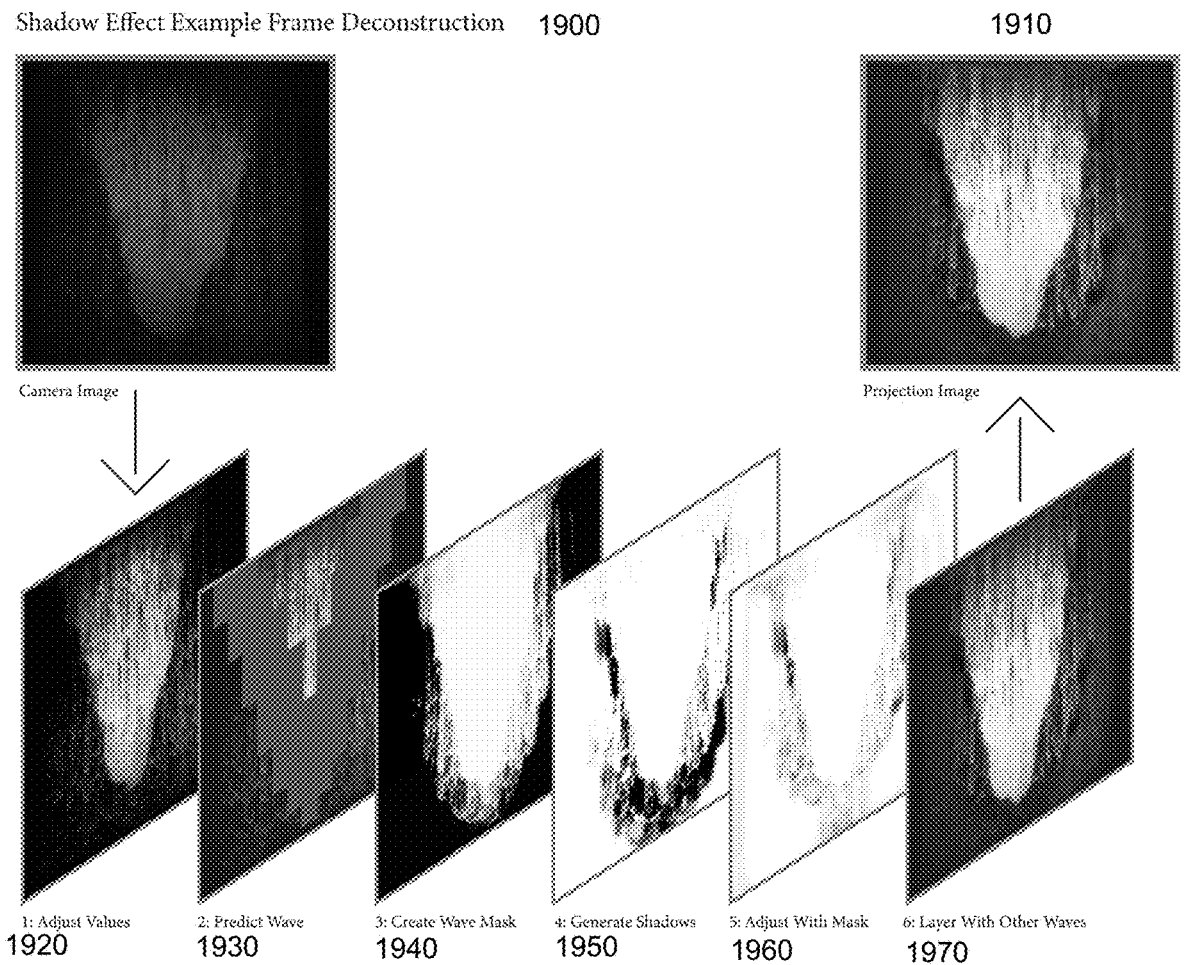
FIG. 18 shows a series of frames regarding the recording, processing and projecting of images, as well as a reversal effect timeline.
Figure 18:
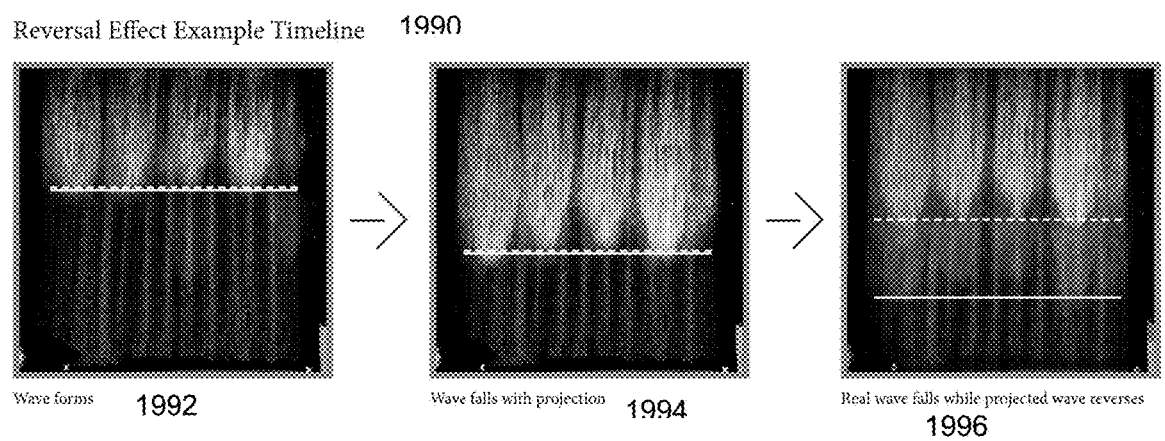

As discussed later in connection with FIGS. 18-19, software may be used to perform the various processing of the recorded infrared light en route to the projected image. This may generally be controlled by central server 1300.

The converted or processed infrared image may be used as an electronic mask or backdrop in any number of ways. For example, computer 300 may now lay "imagery" onto video frames, frame by frame, to provide an output that is routed to projector 1202 which may then project the (infrared-converted-to-visible-light) footage 1232 onto wall 1106. In a preferred embodiment, this converted footage 1232 may be the only signal the projector 1202 is getting, so if there is nothing being fed from the content creation computer 300, the projector is "dark".

Where the infrared-converted-to-visible light signal is the only input feeding projector 1202, so that the only image projected on wall 1106 is the infrared-converted-to-visible light projected footage 1232, unique visual effects may be achieved. This is because that footage will be derived only from the captured infrared footage 1236 (that the observer cannot see) and not also the captured footage 1208 that would otherwise be based on the visible light projected image 1220 (that the observer can see). In other words, the ultimate visual effect that is visible to the observer is an image or footage that is initially invisible to the observer.

The manner in which display 1010 uses flowing water and infrared system 1230 to create visual effects is now further described. In a preferred embodiment, the process of providing the visual effects to observers may represent a "loop" that starts when a volume of water is pushed up and over the top edge 1120 of the wall, cascading down the textured face or wall 1106, and becoming turbulent or aerated as it flows downward. This aeration may generally make the water visible, because ambient light interacting with the water will generally be reflected off the water in gray to white wavelengths, depending on the volume, velocity and/or other characteristics of water flowing down the wall for this particular "wave."

Generally, as shown in FIG. 19 the leading edge of the downwardly flowing water, or wave, is relatively more turbulent, and as such, will reflect significant infrared light 1231 for recording by the infrared camera 1234. The wave may be less turbulent away from the leading edge and thus fade regarding the amount of infrared light it reflects. Where there is no wave and the wall 1106 is exposed to the infrared light 1231, very little or no reflection may occur. In a preferred embodiment, the walls 1106 over which the delivered water 1102 flows, may be illuminated by infrared light 1231, which is not visible to a person. This live image of water rushing down the face of the wall may be received by the processing computer and new video may be generated live that will be projected onto or "paint" the wave as it rushes down the wall 1106. Any other content desired as part of the overall display may also be added. For example, the projected content can also happen in the negative space.

The process of recording reflected infrared light, processing the digital representation of this recorded infrared light and creating a visible light projection preferably occurs quickly so that the projected visible light may be projected onto the wave in generally real time. For example, this may occur in about three frames of recording and video projection.

The visual effects provided by display 1010 are now further described with reference to daytime and nighttime operation. In both scenarios, the color being projected on the delivered water 1102 or the wave(s) as they rush down the wall 1106 is preferably generated on the fly in the processing computer 300, 1300 to paint the wave(s) 1106 by way of infrared-converted-to-visible-light video output to, and projected from, the projector 1204.

A generally steady state stream of water 1102 may flow down wall 1106. However, this visual effect may be the result of previously recorded footage of water flowing down wall 1106, which may then be projected. As such, the appearance of water flowing down the wall may be displayed even without water actually flowing down wall 1106. Alternatively, water 1102 may actually flow down wall 1106 and be illuminated by the video from projector 1204. As noted at the outset, the appearance of velocity at which water 1102 flows down wall 1102 in this steady state may generally condition the observer's perception or brain to what appears to be an expected velocity rate for downward flowing water. It should be noted that the daytime scenario is discussed primarily as a reference point for the night time scenario described later. Generally, it is preferred that the choreography of the display of the current inventions is performed at night, because sunlight occurring during the day time may overpower any projected images. However, as the daytime progresses to dusk, the overall display may provide the visual effects described herein.

A volume of water 1102 may then be pushed up and over the top edge 1120 of wall 1106. For example, water 1102 may be pushed out of one or more boxes 1104 (as shown in FIG. 14) and over top edge 1120. The surface 1106 of wall may be black to facilitate capturing infrared footage 1236. Surface 1106 may also be textured so that the water 1102 flowing down becomes aerated; thus assuming a white to gray color, depending on the volume of water 1102 flowing down surface 1106. This in turn makes water 1102 more susceptible to interacting with the infrared light 1231 that is bathing or illuminating water 1102. That is, more infrared light will be reflected from the white to gray colors of water 1102, than the infrared light reflected from black wall 1106. As such, the live infrared footage 1236 being captured by the infrared camera 1234 generally reflects the water 1106 flowing downward. And as noted above, the infrared light is not visible to the observers of display 1010.

As mentioned above, the live infrared footage is transmitted to controller 300, or central server or computer 1300 for processing, e.g., conversion from infrared light to visible light to be input into projector 1204. To this end, the recorded infrared light is digitized, e.g., where each pixel is assigned a color value according to the gray scale value of the recorded infrared light. The processing speed of computer 1300 is preferably sufficiently fast, e.g., output a new 8000×1920 video frame 60 times per second. This preferably occurs for each single screen (or segment or section) of wall 1106 from which infrared footage is captured, then converted, and then projected as visible light. To this end, each wall 1106 may be considered a single screen for output purposes, with seven screens that are stitched together, e.g., 1200×1920 pixels in portrait per projector, multiplied by seven (7) minus a bit on the 1200 edge for overlap.

The processing speed of computer 300 has resulted in the innovative software features as described above. The resulting process speed provided by computer 300 has made a fast frame rate possible to avoid latency, i.e., late frames of video, which would become obvious with more than approximately 4 or 5 frames latency.

The converted infrared footage is then projected onto water 1102 in real time. However, the speed at which this footage is projected may be varied to provide the visual effect that the water is flowing downward more slowly than it should be, according to the observer's perception, i.e., according to the observer's brain's expectation. For example, the water 1102 flowing down wall 1106 may appear to be flowing more slowly than it "should."

Another scenario is where the water is released from right to left. The manner in which display 1010 may be generated may be similar as described above.

Another scenario is where the water is released from left to right.

The visual effects that may be provided by display 1010 during the night time is now further described. Display 1010 is preferably performed at night and may involve pushing waves of water in a programmed sequence over the edge of wall 1106. It should be noted that the sequence of still shots shown is merely one example of the choreography that may be shown by the overall display. Waves of water may be shown to be suspended in mid-air, slowing down, speeding up, reversing course and ascending, traveling sideways, etc. Furthermore, other visual effects may be added to the display. For example, several starfish, shells or other items that may be found on a beach may be displayed on wall 1106, and may then be swept away by a wave of delivered water. Still further, various colors, music and other audio/visual effects may be included in the overall display.

Referring again to the process of recording, processing and projecting, the water flowing down the wall may be illuminated with infrared light 1231, invisible to observers, but recorded by infrared camera 1234. Infrared camera 1234 preferably captures/records infrared footage 1236 at more than 60 frames a second. However, other frame rates may be used.

The captured infrared footage 126 thereby provides a running real time image of the wall to the processing computers 300. Computer(s) 300 may process the incoming frames of captured infrared footage 1236 as masks, mats or whatever other form is desired to program the timeline as called for by that frame. To this end, computer(s) 300 may generate a video image that is ultimately projected to wall 1106 by using various custom algorithms, filters, and content samples that will put a visible-light video projection on the wave in whatever the programmer has set it to do (for that frame). This may be programmed beforehand not knowing where the waves may actually be when they flow downward, their velocity, opacity or behavior. As such, it is preferred that the recording processing and projection of images is processed and output live. As discuss later, this process may be aided by predicting where the wave may be as it flows downward.

For example, a frame of captured infrared footage 126 may be processed and output to projector 1204 for projection 1202 on the water 1102 flowing down wall 1106. As such, one frame has been output to the projectors; this is preferably followed by the processing and outputting of additional frames at about 60 frames per second.

The overall appearance of display 1010 of the current inventions is now further described. Controller or server 300 may stitch together screens of captured infrared footage from individual sections of wall 1106. This stitched together footage may then be coordinated to be projected at the desired wall 1106.

Plaza with walk through and different features and stairs and different observation points; this could be a destination in and of itself or a significant portion of a theme park, etc. The display may generally reside below surface level so that outside of the display, the walls of the structures forming walls 1106 may not be excessively tall. As such, when observers enter the display, they may walk down stairs and may be below ground level when walking around the plaza and being surrounded by, and immersed in, the audio and visual effects provided by the display.

Referring to FIG. 16, additional aspects of the projectors 1204 are described. As shown, projector 1204 may reside within the structure 1108 which forms wall 1106. This may be preferred so that the hardware associated with projectors 1204 are kept hidden from view of the observers. When configured in this manner, the image emitted from projectors 1204 may be redirected by mirrors that are positioned on top of structures 1108. The projected image may then be directed towards walls 1106. The arrows in FIG. 16 also show airflow which may be directed towards the projector 1204 to cool it.

The recording, processing and projecting of infrared light and visible light images is now further described with reference to the process 1900 shown in FIG. 18. Process 1900 is described with reference to a series of frames taken at different steps along the way.

As shown, in frame 1910, infrared light that is reflected from the water flowing down wall 1106, or reflected off the wall 1106 itself—which may be black—may first be recorded. The color values for each pixel may then be adjusted as shown in frame 1920. The representation may then be processed by predictive wave adjustments as shown in frame 1930. These adjustments may be based on data associated with prior waves emitted under certain circumstances, e.g., how much pressurized air is applied to the water in the boxes 1104 before the water is released. Based on data regarding how the wave proceeds down wall 1106 for a set of circumstances, the representation may be processed in frame 1930 to reflect the prediction where the wave will go and how fast it will go.

As shown in frame 1940, software may be used to create a wave mask. This may occur, for example, where brightness values are adjusted to account for the location on wall 1106 (and associated curvature of the wall at that location) on which the projected image appears. As shown in frame 1940, shadows may then be generated and added to the representation. For example, the wave may be made to appear that it is separated from wall 1006 by adding a shadow that would exist if the wave was actually so separated. Further masking may occur as in frame 1960, and the representation may then be layered with other wave as shown in frame 1970.

At this point, the processed representation may be converted into visible light and emitted from the projectors as the projection image shown in frame 1980. As noted earlier, the projected image may include various colors and visual effects other than those shown in process 1900.

The visual effect whereby a wave is shown to reverse course and ascend up the wall 1106 is now further described with reference to process 1990 of FIG. 18. As shown in frame 1992, the image of waveforms may first be projected onto the flowing water. The projected image of the continued downward flow of the waveform may continue to be shown as in frame 1994. That is, as the actual water continues to flow down wall 1106, and infrared recordings are made and processed into visible light projections, these visible light projections may continue to be projected onto the wave as it flows downward.

However, as shown in frame 1996, while the actual water may continue to flow down the wall 1106, an image that was processed at a time when the wave was further up the wall 1106 may be projected onto the downward flowing water. At this point, the projection image is not being projected onto the leading edge of the wave as it had been previously as in frames 1992, 1994. Instead, the projected image is projected onto water above the leading edge of the wave but shows the leading edge higher up along wall 1106 than it actually is. The resulting visual effect is that the wave appears to be ascending.

The overall process in which the display may operate is now further described with reference to process 2000 of FIG. 19, which shows the relationships between the release of water 1102 down wall 1106, along with the infrared illumination and recording devices 1231, 1234 and projector 1204, along with the steps 2010 performed by video server 1300 and the steps 2040 performed by the show control server.

The show control server may generally perform certain tasks that relate to the overall choreography of the performance. For example, the show control server may first receive a play show command 2042 that will alert the display of the upcoming performance. This may be followed by a pre-show setup 2044 that may initialize and/or sync various components of the display. For example, this setup step 2044 may cause infrared light being emitted from the infrared light sources 1231 to illuminate wall 1106. This may be followed by step 2046 where audio, video, water controls and/or other features or effects of the performance may be synched. When this has occurred, the show control server may then transmit a signal 2048 to the water control to trigger a water expression. For example, this signal may release compressed air into boxes 1104 at the tops of walls 1106 to deliver water 1102 so that it may flow downward.

As the water 1102 flows down wall 1106, and as discussed above, infrared camera 1234 may record the infrared light that is reflected off the flowing water and/or the bare wall 1106. This recorded image may then be transmitted to the processing steps 2010.

First, as shown in step 1012, the infrared image may be received from the infrared camera. This image may be digitized. The infrared video data may then be processed as in step 2014. The wave or water movement prediction may be added as in step 2016. The prediction may be based on how the water is initially delivered to the wall 1106, e.g., under how much pressure of compressed air. The prediction may also be based on tracking the leading edge of previous similar waves.

At this point, a software mask may be created from the infrared video data as in step 2018. This may involve receiving prerecorded video content from the video server 1300 as shown in step 2020, as well as digitally manipulating the infrared video data as shown in step 2022. The prerecorded video content (as well as audio content) may be stored in a library to be accessed as desired.) The prerecorded video content may be mixed with the digitally manipulated infrared video data. For example, certain prerecorded effects may be at the ready when water is released down wall 1106 under certain circumstances. That is, such prerecorded effects may be suitable for water released in a particular manner. Alternatively, the prerecorded content need not be used.

If there is mixing of prerecorded and digitally manipulated infrared data, a composite video may then be obtained as in step 2024. This video data may then be warped to map the data (and ultimately the projected image) to the desired geometry to be featured as in step 2026. The output video may then be obtained as in step 2028 for transmitting to projector 1204. The projector 1204 may then project the visible light image onto wall 1106.

It is preferred that the processing steps 2010 occur sufficiently fast so that the projected images may be projected onto the flowing water in real time or near real time. In a preferred embodiment, this processing occurs within three frames.

It is understood by a person of ordinary skill in the art, upon reading this specification, that the examples described above are meant for demonstration, that the system 10 may include the same, similar or different functionalities as those described, and that the scope of the of the system 10 is not limited in any way by the disclosed examples. It is also understood that any of the embodiments and/or examples of the system 10, described or otherwise, may be combined in any way. It is also understood that while the above examples described the system 10 with respect to altering the visual appearance of moving liquid (e.g., water), the system 10 may alter the visual appearance of any type of physical forms including solids, liquids, gasses, and any combination thereof, and that the scope of the system 10 is not limited in any way by the types of physical forms it may visually alter.

Those of ordinary skill in the art will appreciate and understand, upon reading this description, that embodiments hereof may provide different and/or additional advantages, and that not all embodiments or implementations need have all advantages.

A person of ordinary skill in the art will understand, that any method described above or below and/or claimed and described as a sequence of steps is not restrictive in the sense of the order of steps.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs."

Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

What is claimed is:

1. A system for altering an appearance of water moving down a wall, wherein a reflectivity of the water increases as it moves down the wall, the system comprising:
    at least one video capturing device for capturing video footage of the moving water as the moving water flows down the wall;
    a controller for altering the captured video footage; and
    at least one video projecting device for projecting the altered video footage onto the moving water;
    wherein the at least one video capturing device captures video footage of the moving water, the controller alters at least a portion of the captured video footage,
    and the at least one video projecting device projects at least a portion of the altered portion of video footage onto at least a portion of the moving water.

2. The system of claim 1 wherein the controller alters at least a portion of the captured video footage by decreasing the playback speed of the at least a portion of the captured video footage, by increasing the playback speed of the at least a portion of the captured video footage, or by altering the orientation of the at least a portion of the captured video footage.

3. The system of claim 1 wherein the reflectivity of the water increases due to interaction between the moving water and the wall.

4. The system of claim 1 wherein the at least one video capturing device includes a visible light video camera or a non-visible light video camera.

5. The system of claim 1 wherein the video capturing device is a digital or analog video camera.

6. The system of claim 1, further comprising a water delivery device that delivers water in a laminar state, wherein the water assumes a turbulent state as it flows down the wall.

7. The system of claim 1 wherein the wall has a textured surface with which the water interacts.

* * * * *